United States Patent
Chandrasekaran et al.

(10) Patent No.: US 10,230,609 B2
(45) Date of Patent: Mar. 12, 2019

(54) SYSTEM AND METHOD FOR USING REAL-TIME PACKET DATA TO DETECT AND MANAGE NETWORK ISSUES

(71) Applicant: Nyansa, Inc., Palo Alto, CA (US)

(72) Inventors: Balachander Chandrasekaran, San Ramon, CA (US); Anand Srinivas, San Francisco, CA (US); Murtaza Zafer, San Jose, CA (US)

(73) Assignee: Nyansa, Inc., Palo Alto, CA (US)

( * ) Notice: Subject to any disclaimer, the term of this patent is extended or adjusted under 35 U.S.C. 154(b) by 212 days.

(21) Appl. No.: 15/132,057

(22) Filed: Apr. 18, 2016

(65) Prior Publication Data
US 2017/0302554 A1    Oct. 19, 2017

(51) Int. Cl.
| H04W 8/02 | (2009.01) |
| H04L 12/26 | (2006.01) |
| H04L 29/12 | (2006.01) |
| H04L 12/841 | (2013.01) |

(52) U.S. Cl.
CPC ...... *H04L 43/0882* (2013.01); *H04L 43/0811* (2013.01); *H04L 47/28* (2013.01); *H04L 61/103* (2013.01); *H04L 61/1511* (2013.01); *H04W 8/02* (2013.01)

(58) Field of Classification Search
CPC . H04L 43/0882; H04L 43/0811; H04L 47/28; H04L 61/1511; H04L 61/103; H04W 8/02
See application file for complete search history.

(56) References Cited

U.S. PATENT DOCUMENTS

| 5,929,855 A | 7/1999 | Benton et al. |
| 7,424,608 B1 * | 9/2008 | Cherukumudi ..... H04L 63/0823 |
|  |  | 713/153 |
| 8,015,604 B1 | 9/2011 | Tidwell et al. |
| 9,143,452 B2 | 9/2015 | Lumezanu et al. |
| 9,215,142 B1 | 12/2015 | Herold et al. |
| 9,544,205 B2 | 1/2017 | Chandrayana et al. |

(Continued)

FOREIGN PATENT DOCUMENTS

| EP | 2 518 940 A1 | 10/2012 |
| EP | 2 582 100 A1 | 4/2013 |

(Continued)

OTHER PUBLICATIONS

Das et al., "Transparent and Flexible Network Management for Big Data Processing in the Cloud," 5th USENIX Workshop on Hot Topics in Cloud Computing, San Jose, CA, 2013, 6 pages.

*Primary Examiner* — Walter J Divito
(74) *Attorney, Agent, or Firm* — Seed Intellectual Property Law Group LLP

(57) ABSTRACT

A system and method is disclosed of extracting information from real-time network packet data to analyze connectivity data for client devices in a network. The method includes: detecting when client devices initiate a connectivity event; after detecting a connectivity event, waiting a period of time for the client device to either reach or fail to reach a network connected state; after waiting a period of time, recording connectivity event information; and sending the recorded connectivity event information to an analytics system for network incident and/or network congestion analysis.

18 Claims, 24 Drawing Sheets

(56) References Cited

U.S. PATENT DOCUMENTS

| | | | |
|---|---|---|---|
| 9,619,654 B2 | 4/2017 | Dolan-Gavitt et al. | |
| 9,639,693 B2 | 5/2017 | Rivera et al. | |
| 2003/0033402 A1 | 2/2003 | Battat et al. | |
| 2003/0200277 A1* | 10/2003 | Kim | G06Q 20/401 709/217 |
| 2004/0250124 A1 | 12/2004 | Chesla et al. | |
| 2006/0156032 A1* | 7/2006 | Panjwani | G06F 21/85 713/191 |
| 2006/0233115 A1 | 10/2006 | Matityahu et al. | |
| 2006/0253566 A1 | 11/2006 | Stassinopoulos et al. | |
| 2007/0115916 A1 | 5/2007 | Nguyen et al. | |
| 2007/0223432 A1 | 9/2007 | Badarinath | |
| 2007/0232202 A1 | 10/2007 | Schneeberger | |
| 2008/0016412 A1 | 1/2008 | White et al. | |
| 2009/0265778 A1 | 10/2009 | Wahl et al. | |
| 2010/0299292 A1 | 11/2010 | Collazo | |
| 2010/0332680 A1* | 12/2010 | Anderson | H04L 12/26 709/245 |
| 2011/0008172 A1 | 1/2011 | Jette et al. | |
| 2011/0047286 A1 | 2/2011 | Harrang et al. | |
| 2011/0296015 A1 | 12/2011 | Chakravarty et al. | |
| 2012/0022916 A1 | 1/2012 | Todd et al. | |
| 2012/0198541 A1 | 8/2012 | Reeves | |
| 2012/0311715 A1 | 12/2012 | Tal et al. | |
| 2013/0054773 A1* | 2/2013 | Onoue | H04L 69/22 709/223 |
| 2013/0060603 A1 | 3/2013 | Wagner | |
| 2013/0094376 A1 | 4/2013 | Reeves | |
| 2013/0117847 A1 | 5/2013 | Friedman et al. | |
| 2013/0159395 A1 | 6/2013 | Backholm et al. | |
| 2013/0176858 A1 | 7/2013 | Zee et al. | |
| 2013/0250770 A1 | 9/2013 | Zou et al. | |
| 2013/0290520 A1 | 10/2013 | Noo et al. | |
| 2013/0298170 A1 | 11/2013 | ElArabawy et al. | |
| 2014/0064066 A1 | 3/2014 | Lumezanu et al. | |
| 2014/0068053 A1 | 3/2014 | Ravi et al. | |
| 2014/0086069 A1* | 3/2014 | Frey | H04L 43/026 370/252 |
| 2014/0133497 A1 | 5/2014 | Chapman | |
| 2014/0156824 A1 | 6/2014 | Biswas et al. | |
| 2014/0201642 A1 | 7/2014 | Vicat-Blanc | |
| 2014/0215058 A1 | 7/2014 | Vicat-Blanc et al. | |
| 2014/0215077 A1* | 7/2014 | Soudan | H04L 47/11 709/226 |
| 2014/0254380 A1 | 9/2014 | Swenson et al. | |
| 2014/0280889 A1* | 9/2014 | Nispel | H04L 43/04 709/224 |
| 2014/0304207 A1 | 10/2014 | Chandrayana et al. | |
| 2015/0085694 A1 | 3/2015 | Agarwal et al. | |
| 2015/0113133 A1 | 4/2015 | Srinivas et al. | |
| 2015/0117420 A1* | 4/2015 | Raman | H04L 61/103 370/338 |
| 2015/0142935 A1 | 5/2015 | Srinivas et al. | |
| 2015/0142936 A1 | 5/2015 | Srinivas et al. | |
| 2015/0142962 A1 | 5/2015 | Srinivas et al. | |
| 2015/0229661 A1 | 8/2015 | Balabine et al. | |
| 2015/0249587 A1 | 9/2015 | Kozat et al. | |
| 2015/0295808 A1 | 10/2015 | O'Malley et al. | |
| 2015/0341285 A1* | 11/2015 | Aysola | H04L 63/0428 370/392 |
| 2016/0134469 A1* | 5/2016 | Carter | H04L 63/0823 370/254 |
| 2017/0099195 A1* | 4/2017 | Raney | H04L 43/028 |
| 2017/0288987 A1* | 10/2017 | Pasupathy | H04L 43/028 |

FOREIGN PATENT DOCUMENTS

| | | |
|---|---|---|
| WO | 03/096729 A1 | 11/2003 |
| WO | 2005/109754 A1 | 11/2005 |
| WO | 2009/032925 A1 | 3/2009 |

* cited by examiner

Clients / Client Details

From 01/22/16  07:15am    To 01/23/16  07:15am

08 AM    12 PM    04 PM    08 PM    Sat 23    04 AM

500451
Printer
Last seen Jan 23 7:11 AM (PST)

| User | 9cb6:56:54:58:fe:e9 | Hostname | 500451 |
| IP | 10.64.186.72 | MAC | 9C:B6:54:58:FE:E9 |

98.g.10-
xyzlibrary
ground
Connected:20h11m 98.g.11-
xyzlibrary
ground
Connected:3h39m xyz University
xyz Support 3h    24h    8d    15d Device    Connectivity ①    Network    Applications ⚠ Troubleshooting   From 1-22 7:15 am to 1-23 7:15 am ⏱ Today, 6:10 am - 7:00 am ▾    client could not connect due to DNS issues Potential Root Causes    Next Steps 🔍 Client DNS Misconfig.    ① Check client DNS configuration; ensure local servers are configured.

Attributes    Symptoms    View timeline

SYSTEM AND METHOD FOR USING REAL-TIME PACKET DATA TO DETECT AND MANAGE NETWORK ISSUES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure pertains generally to the fields of extracting information from network packet data. More particularly, the present disclosure relates to a system and method for method of extracting information from real-time network packet data to analyze connective data for client devices in a network.

DESCRIPTION OF THE RELATED ART

Obtaining business-level insight and control over the applications, users and devices in modern networks is becoming extremely challenging. On the applications front, modern networks have a huge mix in application types and deployment locations. For example, business applications may be hosted off-premise in the cloud (e.g., salesforce.com), on-premise in a local data center (e.g., SAP), or on-premise between hosts (e.g., unified communications). On the users and devices front, modern networks are accessed by a myriad of devices from wired desktops to wireless devices such as laptop computers, mobile phones, and tablet PCs.

Traditional performance monitoring or analytics tools work in silos on individual layers of the network stack and do not analyze correlated information across the multiple layers of the network stack to provide a comprehensive view of the network performance from end-user perspective. Moreover, they do not perform analysis across multiple disparate networks to yield better insights for any given network environment.

BRIEF SUMMARY

One embodiment of the present disclosure is directed towards a method of extracting information from real-time network packet data to analyze connectivity data for client devices in a network. The method includes: detecting when client devices initiate a connectivity event; after detecting a connectivity event, waiting a period of time for the client device to reach a network connected state; after waiting a period of time, recording connectivity event information; and sending the recorded connectivity event information to an analytics system for network incident and/or network congestion analysis.

In some embodiments of the disclosed method, the connectivity event comprises a connectivity event determined by looking for a Remote Authentication Dial-In User Service (RADIUS) request, Dynamic Host Configuration Protocol (DHCP) discover message, or DHCP request packet. In other embodiments, a network connected state comprises the client device authenticated with the network, having a valid IP address, and being able to communicate with internal and external computer hosts. In still other embodiments, being able to communicate with internal and external hosts includes Transmission Control Protocol (TCP) or User Datagram Protocol (UDP) traffic transmitted either to a public IP address, or to a different subnet. In yet other embodiments, the connectivity event information includes: RADIUS last state, DHCP last state, ARP (Address Resolution Protocol) last state with respect to default gateway, DNS (Domain Name Server) response, communication with internal or external computer hosts, or combinations thereof.

Continuing, in some embodiments of the disclosed method, a RADIUS last state includes failed, success, timeout, or combinations thereof. In other embodiments, a DHCP last state includes Offer, Acknowledge, No Acknowledge, timeout, or combinations thereof. In still other embodiments, an ARP last state with respect to default gateway includes response, timeout, or combinations thereof. In yet other embodiments, a DNS last state includes response, timeout, or combinations thereof.

Another embodiment of the present disclosure is directed towards extracting information from real-time network data to analyze roaming data for client devices in a network. The method includes: detecting when client devices initiate an association event; buffering data regarding the detected association events; analyzing the buffered data and the association events; and sending the roaming event information to an analytics system for network incident and/or network congestion analysis.

Additionally, some embodiments of the disclosed method further include detecting an association event as an on-the-wire association event by looking for a Remote Authentication Dial-In User Service (RADIUS) request with metadata indicating an association with a particular access point, Service Set Identifier (SSID), or combination thereof. In other embodiments of the disclosed method, the buffering of data comprises buffering TCP (Transmission Control Protocol) traffic before and after the association event, TCP flow related information such as retransmitted packets, RST (Reset) and SYN (Synchronize) packets. In still other embodiments of the disclosed method, analyzing the buffered data comprises determining, if there was traffic before the event, the time span between the last traffic packet before the association event and the first traffic packet after the association event. In yet other embodiments of the disclosed method, analyzing the buffered data comprises determining, if there was TCP traffic before the event, the presence of a high percentage of TCP retransmitted packets. In another embodiment of the disclosed method, analyzing the buffered data comprises determining, if there was TCP traffic before the event, the presence of a high percentage of TCP reset and synchronization packets.

Moreover, some embodiments of the disclosed method further include analyzing roaming data for client devices in a network without on-the-wire association events by computing roaming event information based on short, sliding window periods of time. In other embodiments of the disclosed method, the real-time network data includes: data obtained from deep packet analysis of real-time network traffic, data from network elements including wireless controllers, access points, on-premise network systems, or combinations thereof. In still other embodiments of the disclosed method, the real-time network data includes: device/OS (Operating System) information, wireless metrics, Layer 2 through Layer 4 information, network services related Layer 7 information, Layer 5 through Layer 7 information, and application related data. In yet other embodiments of the disclosed method, the wireless metrics include SNR (signal to noise ratio), packet loss/retransmits, connected access points, channel utilization at the access points, neighboring access points information, rogue/outside-network access points information, interference information in the RF (Radio Frequency) bands, network topology information, CPU (Central Processing Unit)/memory-utilization/reboots/configuration of wireless controllers and access points, or combinations thereof.

In another embodiment of the disclosed method, the Layer 2 through Layer 4 information includes VLAN (Virtual Local Area Network) data, receive/transmit bytes/packets, DSCP (Differentiated Services Code Point) data, TCP (transmission control protocol)/UDP (User Datagram Protocol)/RTP (Real-time Transport Protocol)/SRTP (Secure Real-time Transport Protocol)/FTP (File Transfer Protocol) protocol related data such as latency/retransmits, or combinations thereof. In other embodiments of the disclosed method, the network services related Layer 7 information includes DHCP (Dynamic Host Configuration Protocol), DNS (Domain Name System), RADIUS (Remote Authentication Dial-In User Service) protocol information such as response times and failure codes, or combinations thereof. In still other embodiments of the disclosed method, the Layer 5 through Layer 7 information includes SSL (Secure Sockets Layer) Certificate, hostnames, HTTP (Hypertext Transfer Protocol) response times, or combinations thereof. In yet other embodiments of the disclosed method, the real-time network data pulled from on-premise systems includes call quality records provided by UC (Unified Communications) systems that include client MOS (Mean Opinion Score) scores, network latency, packet jitter, packet loss, abnormal call terminations, failure records, or combinations thereof; real-time network data pulled from on-premise systems including: Netflow/Sflow/SNMP (Simple Network Management Protocol) records from routers, switches, network elements, or combinations thereof.

Another embodiment of the present disclosure is also directed towards a method of extracting information from real-time network packet data to analyze data for devices in a network. The method includes: detecting when client devices initiate a connectivity event; after detecting a connectivity event, waiting a period of time for the client device to accomplish a web event; recording connectivity event information; and sending the recorded connectivity event information that was packaged to an analytics system.

In some embodiments of the disclosed method, the real-time network data is pulled from other on-premise systems including quality records called by Unified Communications systems that include client MOS scores, jitter, packet loss, abnormal call terminations, or combinations thereof. In other embodiments of the disclosed method, the real-time network data is pulled from other on-premise systems including CPU/Memory utilization information from DHCP (Dynamic Host Configuration Protocol), DNS (Domain Name System), RADIUS servers, other network elements, or combinations thereof. In still other embodiments of the disclosed method, the real-time network data is pulled from other on-premise systems including: Netflow/Sflow/SNMP (Simple Network Management Protocol) records from routers, switches, or combinations thereof.

Still another embodiment of the present disclosure is also directed towards a method of extracting information from real-time network packet data to analyze data for devices in a network. This method includes: detecting when client devices initiate a connectivity event; after detecting an connectivity event, waiting a period of time for the client device to accomplish a web event; recording connectivity event information; and sending the recorded connectivity event information that was packaged to an analytics system.

The disclosed embodiments further relate to machine readable media on which are stored embodiments of the disclosed invention described in herein. It is contemplated that any media suitable for retrieving instructions is within the scope of the disclosed embodiments. By way of example, such media may take the form of magnetic, optical, or semiconductor media. The disclosed embodiments also relate to data structures that contain embodiments of the disclosed invention, and to the transmission of data structures containing embodiments of the disclosed invention.

Further aspects of the disclosed embodiments will be brought out in the following portions of the specification, wherein the detailed description is for the purpose of fully disclosing the various embodiments without placing limitations thereon.

BRIEF DESCRIPTION OF THE SEVERAL VIEWS OF THE DRAWING

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

FIG. 17A illustrates a computer screenshot displaying a client network incident for a wired network device;

FIG. 17E illustrates a computer screenshot displaying an infrastructure network incident for a wireless network device, as well as a root causes and symptoms analysis;

DETAILED DESCRIPTION

Figure 1:
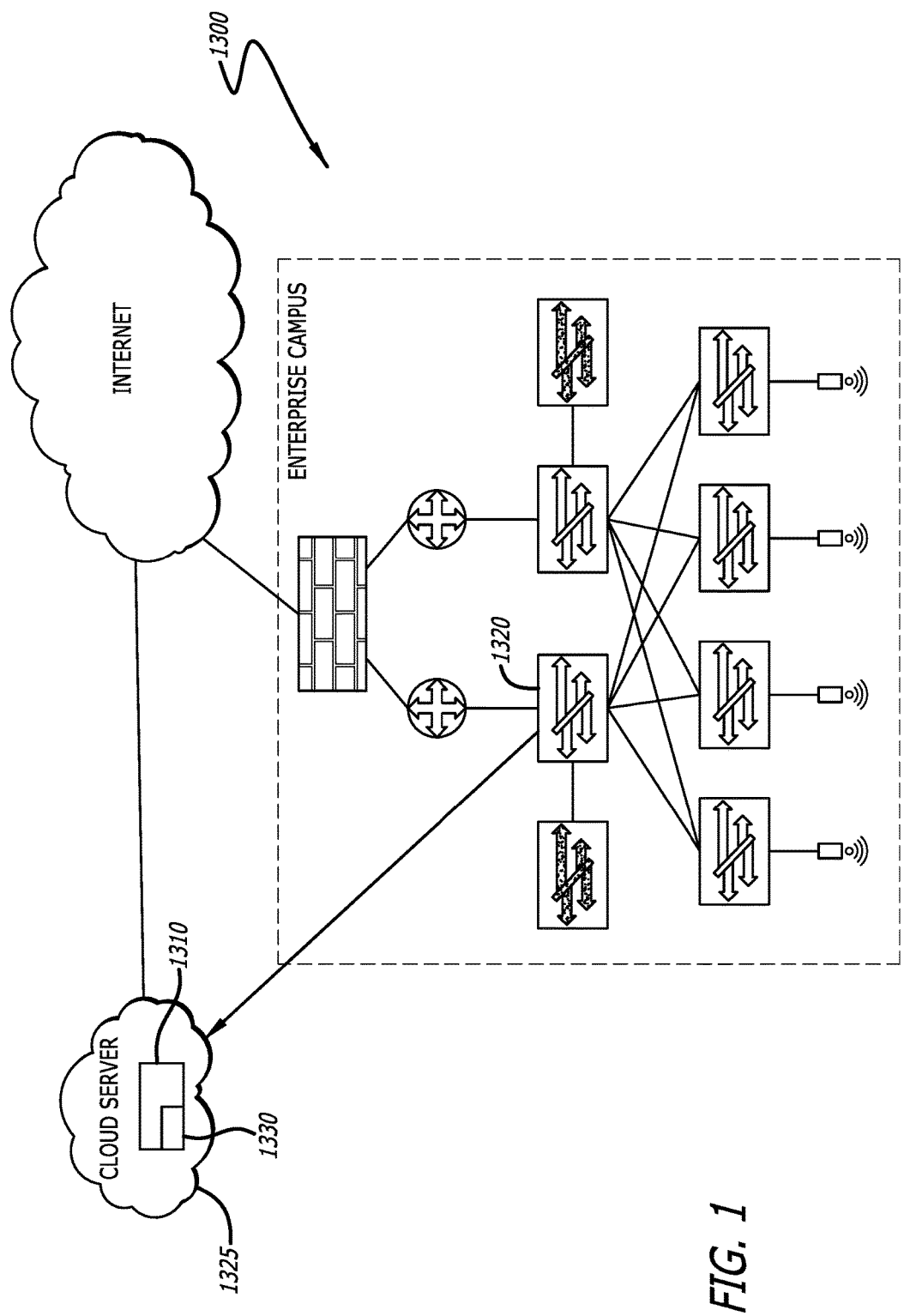
FIG. 1 illustrates system architecture of an exemplary network incident identification, analysis, and remediation system deployed in an enterprise network, according to one embodiment.

Persons of ordinary skill in the art will understand that the present disclosure is illustrative only and not in any way limiting. Other embodiments of the presently disclosed system and method readily suggest themselves to such skilled persons having the assistance of this disclosure.

Each of the features and teachings disclosed herein can be utilized separately or in conjunction with other features and teachings to provide a system and method for extracting information from real-time network packet data to analyze connective data for client devices in a network. Representative examples utilizing many of these additional features and teachings, both separately and in combination, are described in further detail with reference to the attached figures. This detailed description is merely intended to teach a person of skill in the art further details for practicing aspects of the present teachings, and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The disclosed system and method is directed towards a method of extracting information from real-time network packet data to analyze connective data for client devices in a network. According to one embodiment, the method includes: detecting when client devices initiate a connectivity event; after detecting the connectivity event, waiting a period of time for the client device to accomplish a web event; after waiting a period of time, recording connectivity event information; and sending the recorded connectivity event information that was packaged to an analytics system for network incident and/or network congestion analysis. In one embodiment, the period of time is 10 minutes. In other embodiments, the period of time may be 1, 2, 5, 20, or 30 minutes.

Within the context of the description of network incidents in the present application, the phrase "network incident" is defined as the presence of a "pattern" over the computed values of one or more performance metrics for a certain time window. A pattern is defined as one of the following, (a) the proportion of metric values that cross a threshold exceeding a defined percentage amount, (b) the presence of a certain sequence of metric values, (c) time-ordered stretch of certain metric values with the length of the stretch exceeding a defined threshold, and (d) presence of a cyclical sequence of metric values. Network incidents are further classified herein either as a Client network incident or as an Infrastructure network incident. A client network incident is a network incident where the computed metrics relate to the calculations on data that relates to a user/client in the network. An infrastructure network incident is a network incident where the computed metrics relate to the calculations on data that relates to an infrastructure element in the network.

Within the context of the present application, the term "real-time" is defined as collecting network data related to a wired or wireless network flow/transaction and performing calculations on the network data within a short duration (e.g., seconds or minutes) of the occurrence of the network flow/transaction.

Continuing, within the context of the present application, the phrase "client perception of the infrastructure" is defined as a client-centric view of infrastructure factors including type, configuration, and state. For type, an example would be "60 percent of clients are connected to wireless controllers that are model X" instead of "60 percent of the wireless controllers are of model X." For configuration, an example would be "55 percent of clients are connected to a DHCP server with IP conflict detection enabled." Finally, an example of state would be "70 percent of clients are connected to an access point with greater than 100 simultaneously associated clients."

As shown in FIG. 1, a functional diagram of an enterprise network is illustrated, according to one embodiment. The network includes switches, wireless controllers, routers, and a firewall. All of these elements can be physical or virtual, and the wireless controller can be logical or physical, located either on-premise in its own physical appliance, within an AP, or in the cloud.

Figure 2:
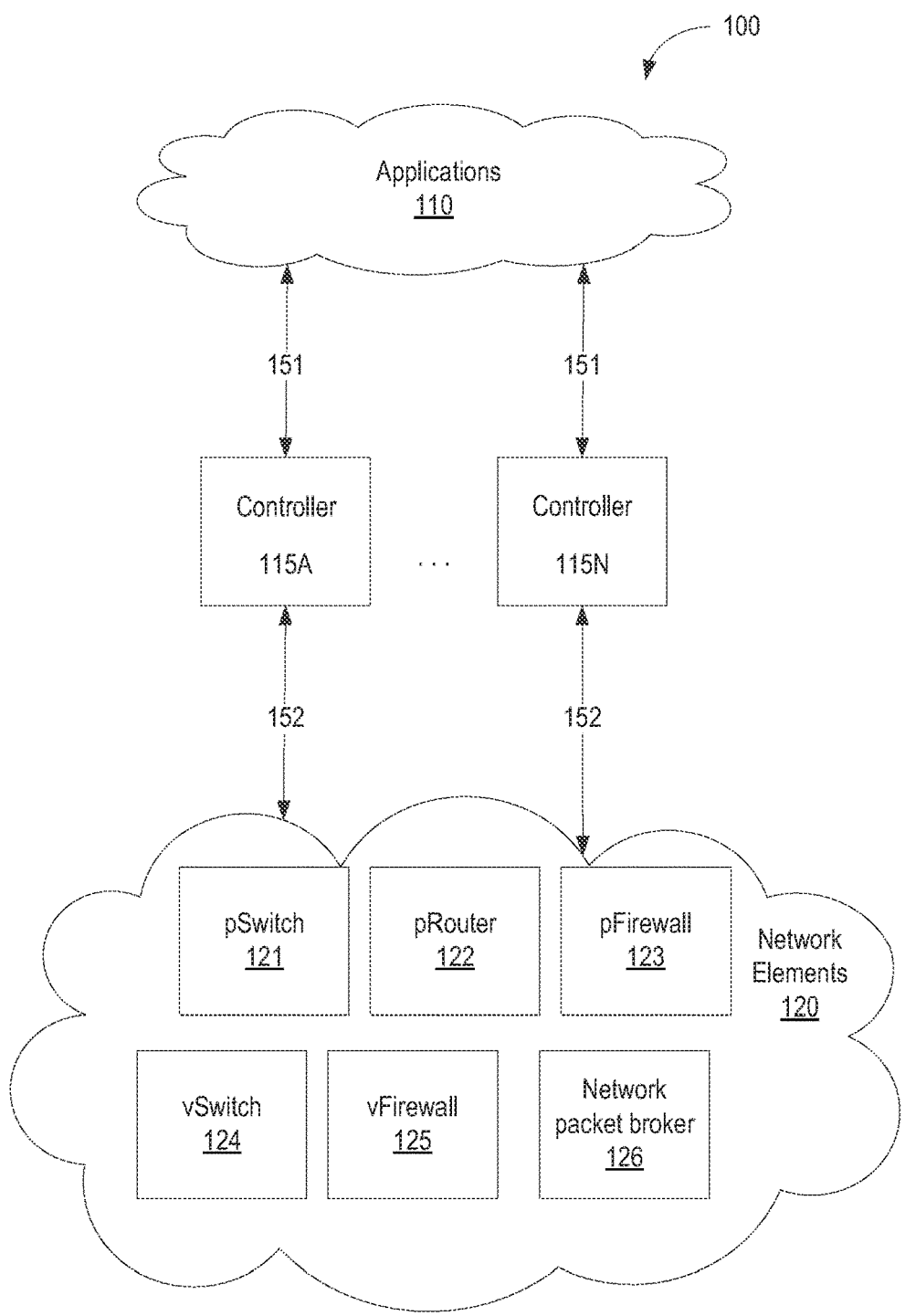
FIG. 2 illustrates a functional diagram of a network, according to one embodiment.

Referring now to FIG. 2, a functional diagram of a network is illustrated, according to one embodiment. The network 100 includes applications 110 and network elements 120 that are linked via one or more controllers 115A-115N. The "p" and "v" prefixes on the network elements 120 indicate physical and virtual network elements, respectively.

The network elements 120 include a physical switch (pSwitch) 121, a physical router (pRouter) 122, a physical Firewall (pFirewall), a virtual switch (vSwitch) 124, a virtual firewall (vFirewall) 125, and a physical network packet broker 126. It is appreciated that the network elements 120 can include any number of physical switches 121, physical routers 122, physical firewalls 123, virtual switches 124, virtual firewalls 125, and physical network packet brokers 126, and other physical or virtual network elements, without deviating from the present disclosure.

Network functions virtualization (NFV) refers to the implementation and deployment of software-based network elements. Such software-based network elements typically run on generic processing hardware (e.g., x86 machines) as opposed to non-NFV network elements that require dedicated hardware (e.g., Application-Specific Integrated Circuits (ASICs)). Examples of NFV-type network elements include, but are not limited to, a virtual switch 124 and a virtual firewall 125. It is appreciated that other types of NFV-type network elements may be implemented without deviating from the present disclosure. Such NFV-type network elements may be run as a virtual machine on top of a hypervisor that runs on commodity hardware. The present system and method provides monitoring and controlling of NFV and/or non-virtualized network elements.

An application delivery network (ADN) encapsulates several technologies that provide application-layer functionality in the network. A next generation application firewall, for example, is an appliance that provides inline access control functionality as a function of L4-L7 header information as well as application, user and content layer metadata. This appliance can perform inline deep packet inspection to identify applications in real-time and perform access control.

The control embodiments of the present system and method provide capabilities of controlling basic network elements such as switches and routers and wireless controllers, to the end of programming policies including security and/or quality related. The present system and method can reduce hardware and distributed functionality.

The network packet broker 126 (or a matrix switch) gathers, aggregates and filters network traffic from port mirrors, network TAPs, and probes. The network packet broker 126 serves the filtered network traffic to network security and performance tools as per their network security and performance tools. For example, a network security and performance tool may only support 1 GBps of traffic, and a network packet broker 126 can be manually configured to filter and shape traffic from a 10 GBps link to conform to the constraint of the network security and performance tool. Typically the network packet broker 126 is decoupled from the network security and performance tools to which it delivers the packets.

A portion of the present system and method performs as a network security and performance tool. In one embodiment, the present system and method intelligently and dynamically programs a network packet broker 126 to gain access to the traffic it needs. The present system and method also summarizes and indexes higher-layer information about users, applications, devices, behaviors, and the like (e.g., via machine learning), and enables the higher-layer information to be queried using a natural language processing technique. According to one embodiment, the present system and method is deployed in a cloud to enable advanced analytics and cross-network learning. "Cloud" herein refers to a computer and storage platform service hosted over a wide area network (e.g., the Internet). It is noted that both ADN and network security/performance monitoring tools are typically deployed on-premise.

The present system and method observes and controls a programmable network via higher-layer attributes and addresses the drawbacks of prior systems for monitoring and controlling networks. The discussion is divided into three sections: (1) architecture, (2) visibility, and (3) control.

Architecture

Figure 3A:
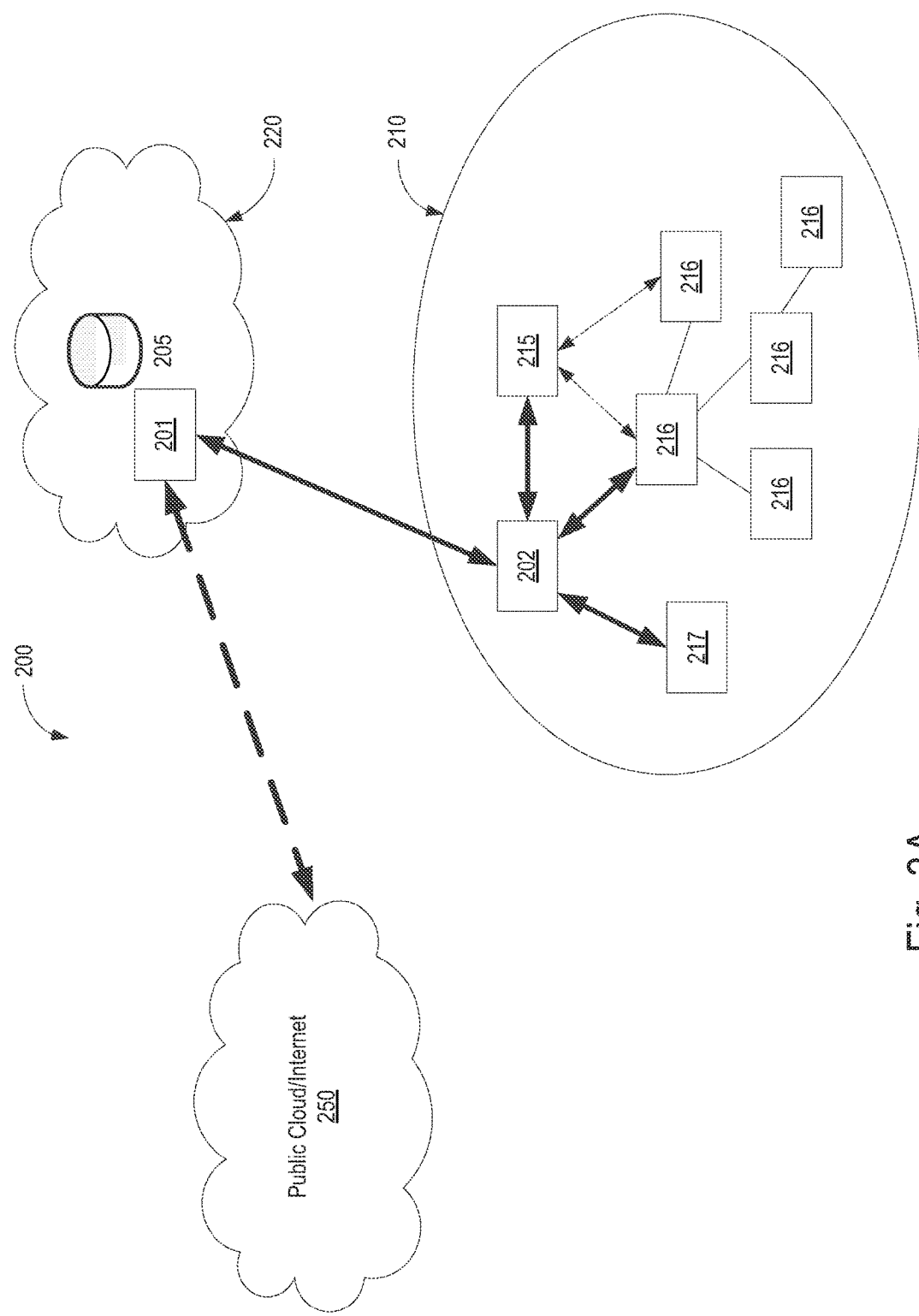
FIG. 3A illustrates system architecture of an exemplary system deployed in an enterprise network, according to one embodiment.

FIG. 3A illustrates system architecture of an exemplary system deployed in an enterprise network, according to one embodiment. The system 200 includes a manager 201 (or Loupe Manager) and one or more collectors 202 (herein referred to as Loupe Collectors). In one embodiment, the collector 202 is a software appliance (virtual or physical) that is located on-premise. The collector 202 may be deployed as a single software element, or for scaling a cluster of, or several, software elements. For example, the collector 202 is logic in a non-transitory computer readable memory that can be executed by a processor to perform the actions described herein. In other embodiments, the collector 202 is a combination of hardware and software.

According to some embodiments, there are multiple collectors 202 per enterprise network 210 (e.g., a campus, a data center) and multiple networks 210 and collectors 202 per customer. Moreover, the collectors 202 can be deployed behind firewalls within an enterprise network 210. This enables the collectors to easily communicate with enterprise systems on-premise and also behind the firewall to easily communicate outbound with systems off-premise.

The collector 202 receives live packets captured directly from physical and/or virtual network elements 216. The collector 202 also receives data (e.g., topology, statistics, user information, and the like) from other enterprise systems including identity management systems (e.g., active directory 217), network element controllers (e.g., controllers 215, network management systems), and the like. The collector 202 also runs performance tests against on/off-premise applications in the public cloud/Internet 250 (e.g., BOX®, MICROSOFT OFFICE365®, GOOGLE®, WEBEX®, WORKDAY®, SALESFORCE®) and collects the performance results.

The collector 202 captures all of these data, extracts key metadata or features, and compresses and sends the key metadata or features to the manager 201 that is located in a public cloud 220. For example, the collector 202 receives 10 s or 100 s of gigabits per second of data, but only sends 10 s or 100 s of kilobits per second of data to the manager 201. The collector 202 is provisioned and configured by the manager 201, thus the commands from the manager 201 towards systems that are on-premise can be proxied via the collector 201. In one embodiment, the manager 201 may also be deployed in a private cloud or elsewhere within a large multi-site organization.

The manager 201 summarizes and stores the data received from the collector 202 in a database 205. The manager 201 performs additional data collection from off-premise enterprise systems and other applications over the public cloud/Internet 250 and runs its own performance test. The manager 201 applies learning and other heuristic algorithms on the data and binds higher-layer information (e.g., about users, applications, devices, and behaviors) to the data. The manager 201 also computes the crawling schedule for the collectors 202 to receive data from different parts of the network. The manager 201 is also responsible for providing an Internet interface and a natural language query capability to retrieve ranked answers based on the learned data. Similar to the collector 202, the manager 201 is a software appliance that can be deployed in a cluster or in multiple tiers. The manager 201 contains a database 205 that can support large data storage and efficient queries (e.g., BigTable®). Generally, there can be one manager 201 for many organizations and/or enterprises (e.g., multi-tenant style deployment), or multiple managers 201 for multiple organizations and/or enterprises. The manager 201 may also be logic in a non-transitory computer readable memory that can be executed by a processor to perform the actions described herein or a combination of hardware and software.

Figure 3B:
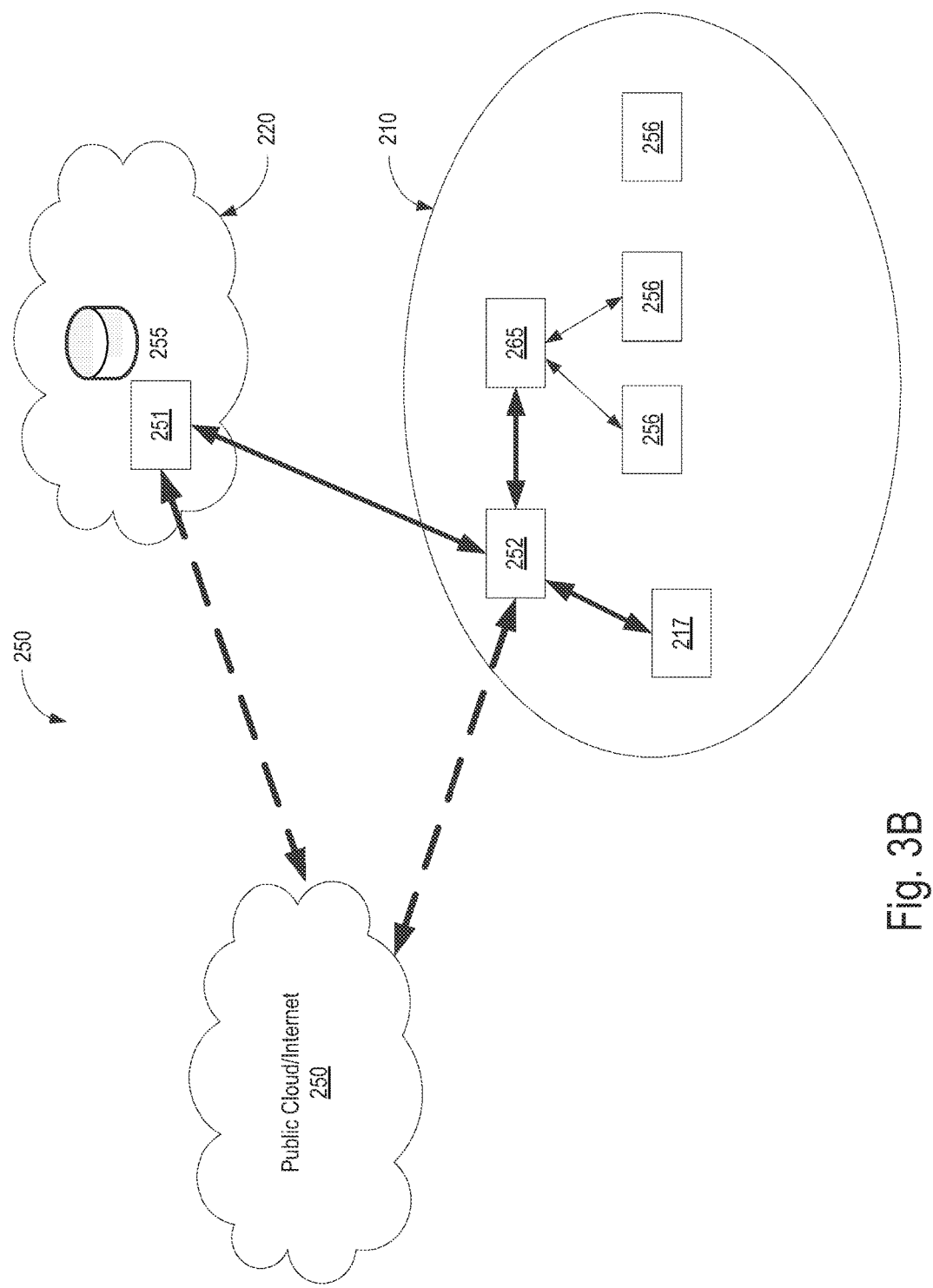
FIG. 3B illustrates system architecture of an exemplary system deployed in an enterprise network, according to another embodiment.

FIG. 3B illustrates system architecture of an exemplary system deployed in an enterprise network, according to one embodiment. The system 250 includes a manager 251 on a server 255, a collector 252, a wireless controller 265 that controls one or more wireless access points (APs) 256. The wireless controller 265 may take many forms, for example, (i) a separate on-premise software running on its own hardware, (ii) software that is integrated into the access points 256, or (iii) software located off-premise (e.g., in a cloud 220). The wireless controller 265 controls and/or configures the access points 256 and terminates data plane traffic coming from mobile devices that are wirelessly connected to the access points 256. The wireless controller 265 is an example of a network element, as well as a controller that controls several other network elements (e.g., access points 256).

The collector 252 collects wireless metrics from the controller 265 via a management interface (e.g., simple network management protocol (SNMP), command-line interface (CLI), proprietary management protocol). Examples of these metrics for a mobile device include, but are not limited to: signal strengths, layer 2 traffic statistics (e.g., packets transmitted, retried, dropped), traffic transmission rates, device location, and user information. Examples of these metrics for an access point include, but are not limited to: channel utilization, aggregated layer 2 traffic statistics, interference measurements, CPU/memory utilization.

The collector 252 simultaneously collects metrics and other information from other enterprise systems where available, via their respective management interfaces. One example is collecting user role as well as user-to-IP address information from a directory server (e.g., LDAP, Active Directory). Another example is collecting unified communication performance metrics from a Microsoft Lync Server).

The collector 252 simultaneously sees network traffic via a mirrored interface via a logical or physical port mirror off of the wireless controller 265, or a logical or physical port mirror off of another network element (e.g., switch, router, access point) in the network where relevant user traffic is carried.

From the traffic, the collector 252 performs deep packet inspection (DPI) and extracts, in addition to general protocol level metadata, user/device quality of experience (QoE) related metadata, differing on an application-by-application basis. For example, Internet browsing QoE metrics include page load times and/or HTTP URL response times. Voice and video application QoE metrics involve extracting and/or computing the relevant mean opinion score (MOS) values.

According to some embodiments, the present system and method time aligns the QoE metadata with metadata extracted across the application stack including the wireless layer metrics from the wireless controller 265. For example at a particular time interval, a user/device may have poor page load times, high transmission control protocol (TCP) retransmits, low signal-to-noise ratio (SNR), high AP channel utilization. The present system and method collects and stores this time series data, and analyzes the time series data for trends/patterns over time and other dimensions (e.g., device type, location). For example, the present system and method finds that ANDROID® devices suffer consistently worse Internet performance than IOS® devices.

According to some embodiments, the present system and method analyzes for trends/patterns across networks. For example, the present system and method identifies the specific network/protocol/wireless metrics to determine the application performance. As an example, the present system and method analyzes a bad Microsoft Lync® voice application performance (e.g., mean opinion score (MOS)) across many customer networks. The present system and method learns that the most important indicator is high levels of layer 2 packet retransmissions. Based on this assessment, the present system and method predicts, for a new customer network that has high levels of layer 2 packet retransmissions, that Microsoft Lync® performance would be poor unless the packet retransmissions problem is rectified.

Figure 4:
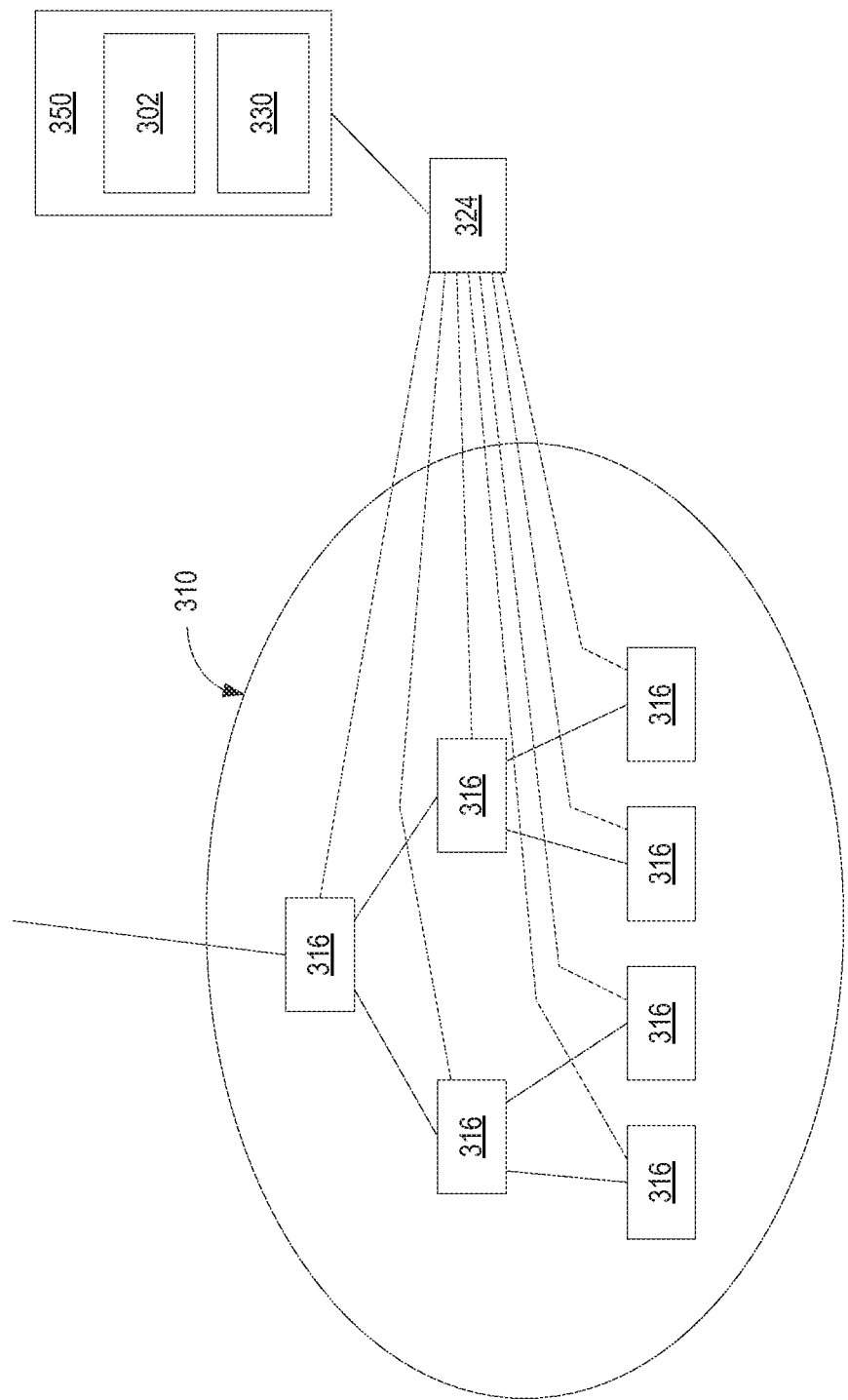
FIG. 4 is a block diagram of an out-of-band deployment, according to one embodiment.

The present system and method has applicability to two use cases: visibility and control. From an architecture perspective, there is a difference between deployment possibilities between the two use cases. In particular, for passive visibility only, the present system and method can be deployed out-of-band. FIG. 4 is a block diagram of an out-of-band deployment, according to one embodiment. A programmable switch 324 receives mirrored traffic of network elements 316 and communicates with a server 350 including a collector 302 and a controller 330. The mirrored traffic (as indicated in dotted lines) from the network elements 316 is forced through the programmable switch 324. The programmable switch 324 can be dynamically controlled and programmed to direct specific traffic during specific time intervals and network locations to the collector 302. For example, the controller 330 controls the programmable switches 324. In a case where the total bandwidth of the traffic being monitored is less than the bandwidth of the collector 302, the programmable switch 324 may not be necessary and all mirrored traffic can be directly sent to the collector 302. An example of this case is where only the wide area network (WAN) links within an enterprise network are monitored.

Figure 5:
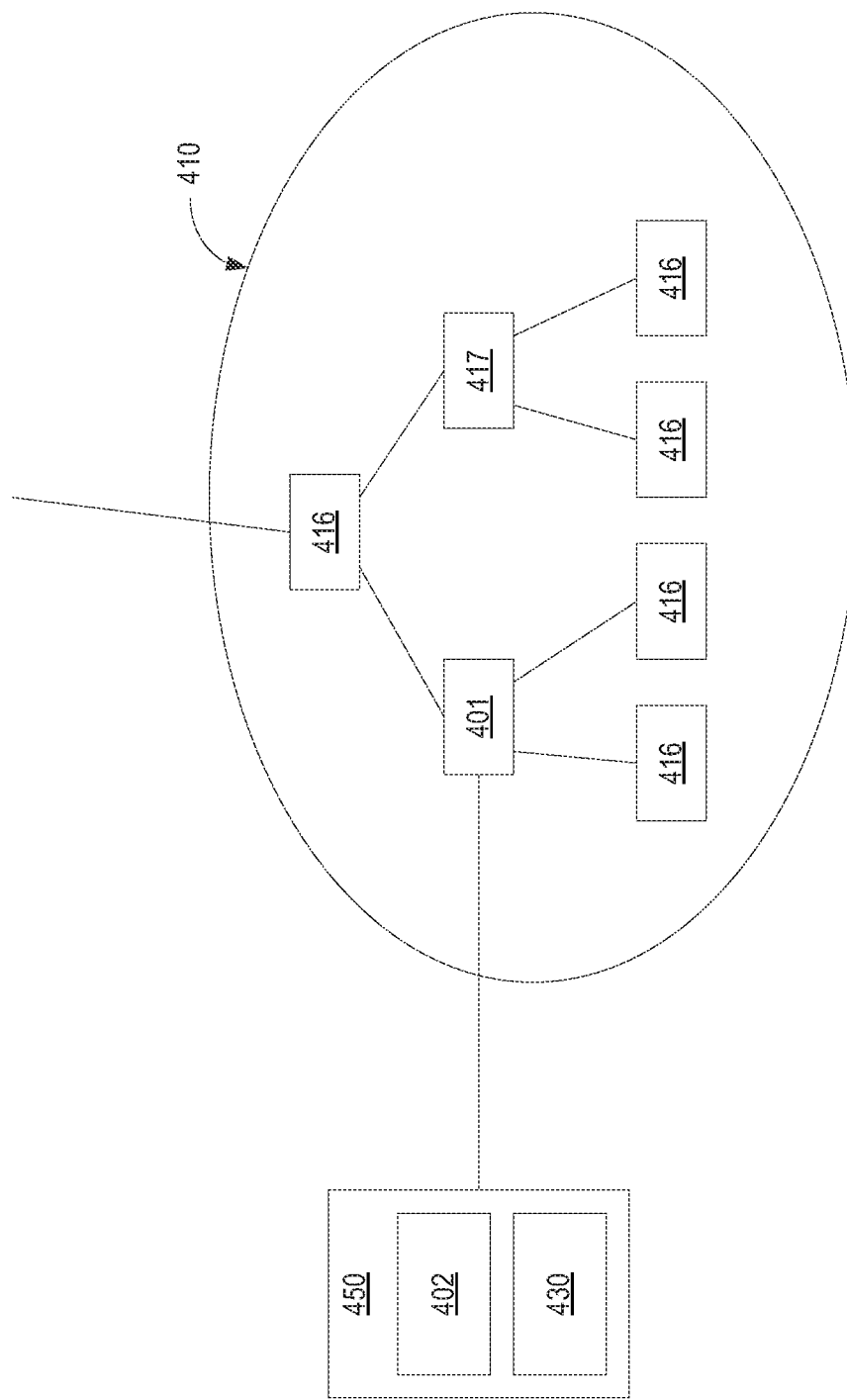
FIG. 5 is a block diagram of an inline deployment, according to one embodiment.

For control, the present system and method employs an inline deployment, according to some embodiments. In this case, a subset of the network elements carrying regular traffic (e.g., non-mirrored traffic) is programmable. Moreover, these network elements (e.g., physical and virtual switches, wireless access points) may be located such that the policy can be effective, for example, to form a physical or logical choke point. FIG. 5 is a block diagram of an inline deployment, according to one embodiment. A manager 401 receives traffic from non-programmable network elements 416 and programmable network element 417 and communicates with a server 450 including a collector 402 and a controller 430. In this embodiment, the manager 401 is deployed on-premise in a private cloud 410, but it is apparent that the manager 401 can be deployed off-premise in a public cloud as illustrated in FIGS. 3A and 3B.

The manager 401 located in a cloud is capable of observing across multiple customer networks. While the manager 401 (whether it is a multi-tenant manager or a separate manager per customer) may be deployed in a private or public cloud to preclude sharing of data across multiple networks, the present system and method may achieve overall performance improvement by combining trained algorithms from each of the customer networks.

Visibility

The present system and method provides crawling and indexing the network and enables natural language query about the network and applications, users, devices and behaviors. The specific flow for network visibility is in the following order:

RAW DATA→CRAWLING→FEATURES EXTRACTION→SUMMARIZATION→INDEXING→ADVANCED ANALYTICS AND CROSS-NETWORK-LEARNING→QUERY-ABILITY

Figure 6:
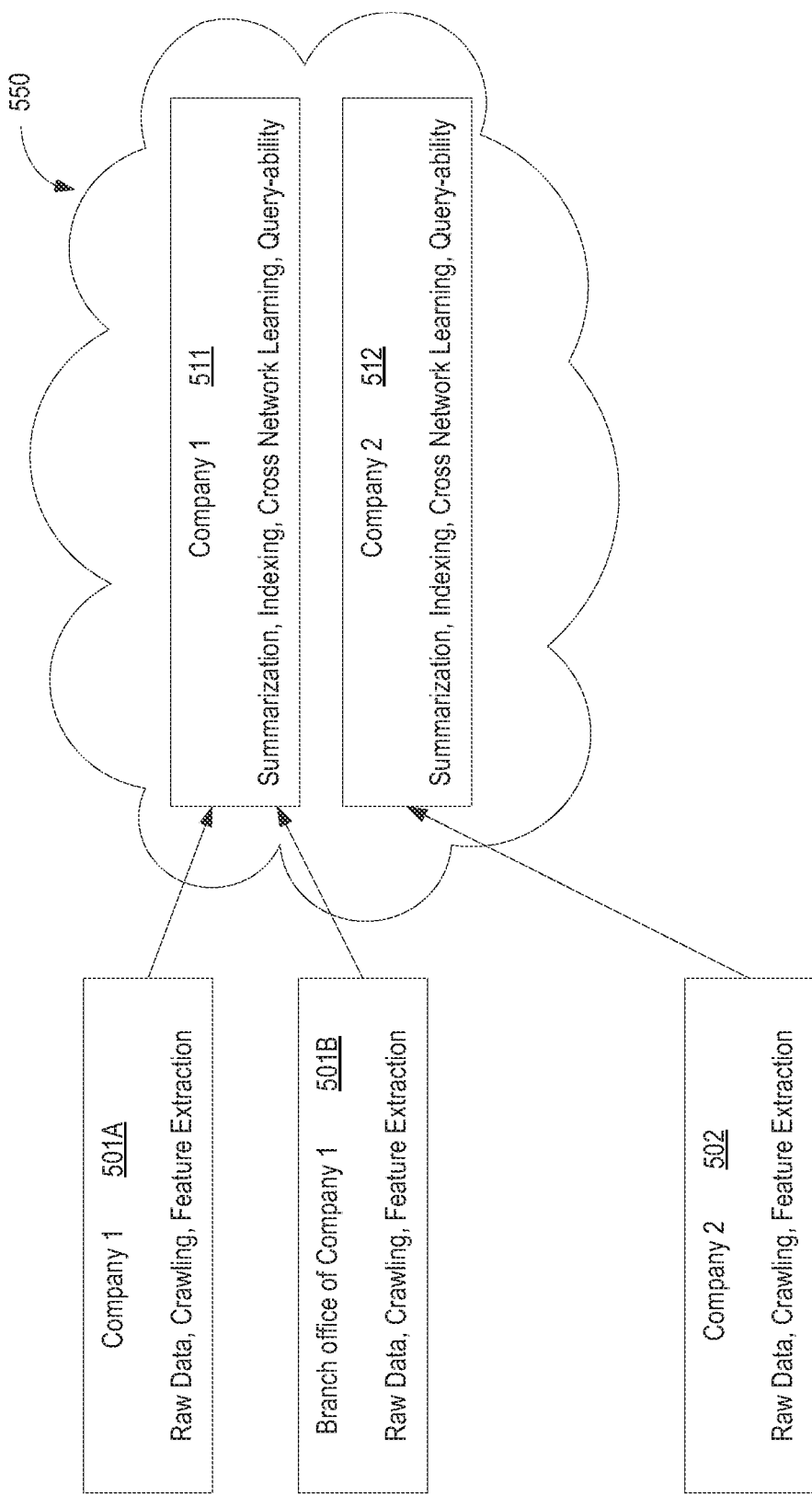
FIG. 6 is a flow diagram for providing network visibility, according to one embodiment.

FIG. 6 is a flow diagram for providing network visibility, according to one embodiment. The RAW DATA→CRAWLING→FEATURES EXTRACTION pieces occur on-premise (e.g., collectors of Company 1 (501A), a branch of Company 1 (501B), Company 2 (502)), and the SUMMARIZATION→INDEXING→ADVANCED ANALYTICS AND CROSS NETWORK LEARNING→QUERY-ABILITY pieces occur in a cloud 550 (e.g., managers of Company 1 (511) and Company 2 (512)). It is noted that these functionalities may be split across a manager and a collector in a variety of ways without deviating from the scope of the present disclosure. For example, partial summarization can occur in the collector as opposed to the manager. Furthermore, the manager's functionalities can itself be broken apart into several pieces and implemented on a distributed computing system consisting of multiple different components. An example is the case where the data-summarization and data-analytics are performed on two separate multi-machine systems that communicate with each other.

Raw Data

The raw data includes data that can be collected or crawled by a collector or a manager. The first piece of raw data that is crawled is a live traffic on the network that can be accessed by one or more collectors. The raw data can further include statistical, topological and configuration data—received either from network elements directly, or via an intervening controller or a manager. Examples of raw data include, but are not limited to, sampled flow (sFlow®) and SNMP data harvested from network elements. Similarly, topology information can be gleaned from a controller if available. Other information gleaned from other enterprise systems (on- or off-premise) is also applicable; for example, user information received from an ACTIVE DIRECTORY® server.

The raw data also includes the results from pro-active performance tests with respect to on- and off-premise applications. In one embodiment, the collector runs proactive performance tests (e.g., HTTP GETs, PINGs) with various target applications. These target applications can be automatically detected by the present system and method or specifically user pre-configured.

Crawling Raw Data

Crawling herein refers to an act of dynamically selecting a different set of raw data for the collectors to examine at any given time. For example, crawling includes observing different physical or virtual links, and applying different filters to the raw data.

In many cases, the total amount of traffic exceeds the bandwidth of a collector. This necessitates a device with network packet broker equivalent (NPBE) functionality that is capable of driving mirrored and filtered traffic from multiple parts of the network to the collector. The present system and method dynamically programs one or more NPBE devices with filtering and steering rules to get selected access to the data. However, the present system and method also is applicable to a case where the traffic mirrored to the collector comes from a small number of locations (e.g., mirrored traffic from WAN links), and when the total simultaneous mirrored traffic is less than the bandwidth of the collector. This case may not require a NPBE device. In one embodiment, the NPBE is one or more software elements, for example, running as part of the collector.

"Crawling" the raw data is a significant problem, especially in situations where the disclosed system and method dynamically controls one or more NPBEs within the network to capture packets from different parts of the network at different times. In one embodiment, NPBE functionality is implemented by a controller operating on top of a switch. In this case, the manager, either directly or proxied via the collector, can command the controller to have the underlying network elements implement the NPBE functionality.

The method for controlling the network packet broker equivalent is for the manager to compute a dynamic crawling and filtering schedule that informs the NPBE on how it may steer traffic to the collector. The computation of the dynamic crawling and filtering schedule may be done in a variety of ways; for example, but not limited to, as a function of topology, computation and network resources at the collector, and statistics.

An example of a dynamic crawling and filtering schedule is: Send all ingress and egress traffic from link e1 to the collector; From link e2, send ingress and egress traffic with source or destination port equal to 80 to the collector; and Cycle through links e3, e4, e5 and e6, 5 minutes at a time, sending all traffic to the collector.

A dynamic crawling and filtering schedule with more complicated logic may be sent to the collectors. For example, collectors can be provisioned with a program that searches for a dynamic trigger to alter the schedule. For example, the dynamic trigger is: "if an application X is detected and is using Y bandwidth, then monitor traffic from the link more frequently." In another embodiment, the dynamic crawling and filtering schedule is computed to optimize load balancing between collectors, for example, "send the 1 GBps of traffic from link e1 to collector #1 and the 1 GBps of traffic from link e2 to collector #2."

According to one embodiment, the collector crawls performance information of on- and off-premise applications that the present system and method detects use of, or is pre-configured by a user. The performance information may be generated by the collector performing performance tests (e.g., PING, TRACEROUTE, HTTP GETs) against the applications. The performance information can be crawled by periodically running the same HTTP GETs against a target application that is pre-configured or automatically detected, and sending to the manager the detected results. The crawling schedule may include a command, for example, "if a new application is detected, then immediately start running performance tests against it."

According to some embodiments, the raw data can be collected from a controller or a network management system in the following process: Global view of L1 L7 Network Topology, Port statistics for each network element, if available, Current Configuration of each network element under control, Configuration Capability of each network element under control, API functionality and configuration capabilities of the controller itself, Any higher-layer information available regarding users, applications, devices, locations, and the like.

According to some embodiments, the raw data can be collected from an enterprise system (e.g., ACTIVE DIRECTORY®, light directory access protocol (LDAP) servers, single sign-on (SSO) system). Examples of such raw data include, but are not limited to, user information such as roles and associated policies, login status, and IP address.

According to some embodiments, the raw data can be collected from network elements directly (e.g., by way of a priori instructions given to a controller) in the following process:

Sampled mirrored traffic from various ports in the network, Advanced statistics such as sFlow®, netFlow®, Previously computed information regarding users, applications, devices, locations, and Signal strength, error-rate, and other performance related information.

According to some embodiments, the raw data can be collected from the present system or other policy engine such as desired high-level policies. According to some embodiments, Performance data generated by the collector includes results of proactive tests (e.g., PING, HTTP, TCP) performed by the collector on detected or user pre-configured on/off-premise applications.

Figure 7:
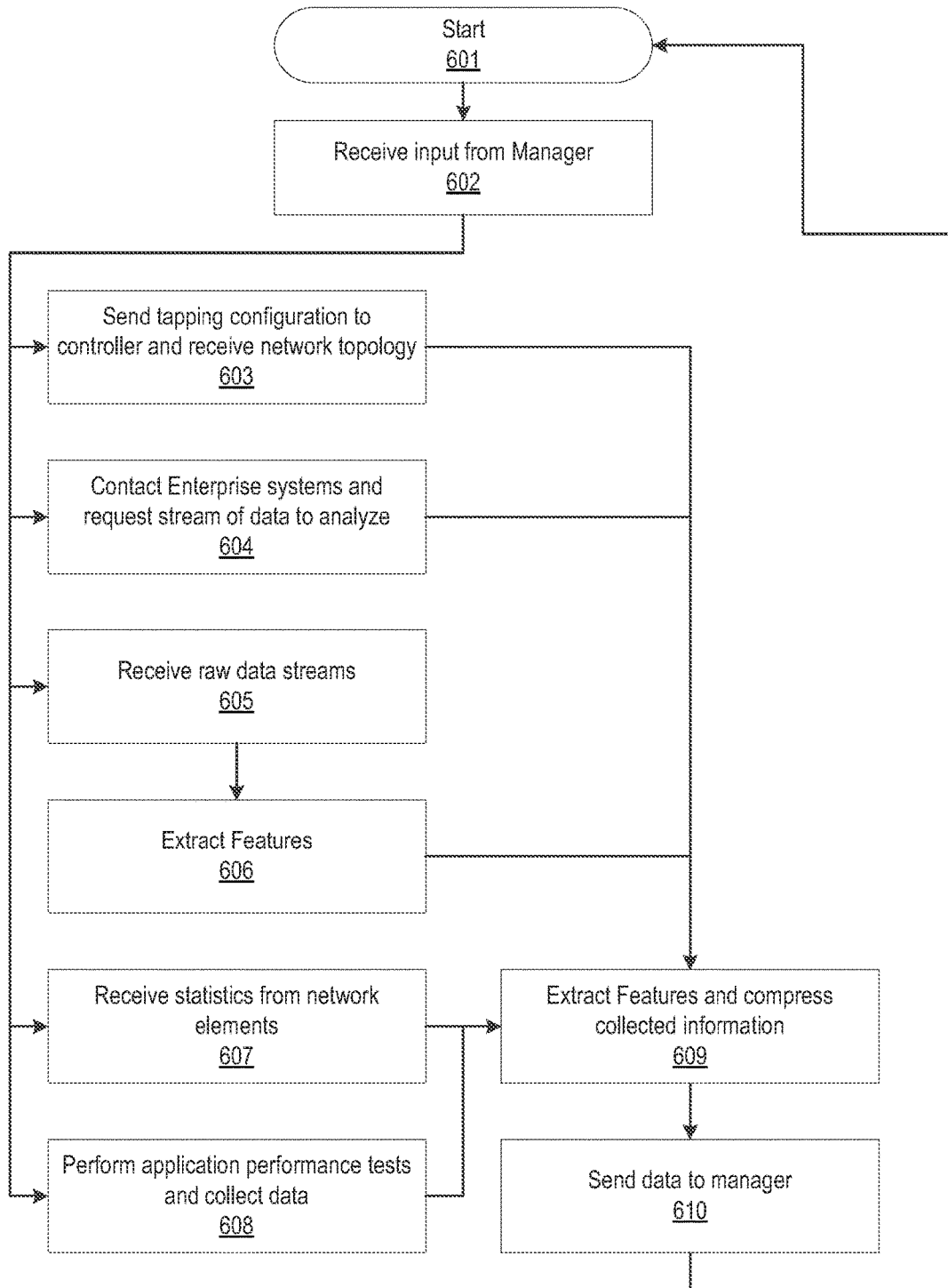
FIG. 7 is a flow diagram of an input collection process at the collector, according to one embodiment.

FIG. 7 is a flow diagram of an input collection process at the collector, according to one embodiment. The input collection process starts (at 601) and a collector receives inputs from a manager (at 602). Examples of inputs include, but are not limited to: instructions on which enterprise systems to collect data from and how to collect the data (e.g., IP address, credentials), sampling schedule for data collection from network elements, instructions on initial analysis, filtering, compression of collected data, and list of applications to run performance test.

The collector further sends desired tapping configuration to the controller and receives network topology (at 603), contacts the enterprise system and requests a stream of data to analyze (at 604), receives sampled raw data streams identified by time and link (at 605) and extracts features from the received sampled raw data streams per instructions (at 606), receives advanced statistics from network elements (at 607), and performs application performance tests and collects data (at 608). The controller further extracts features using information collected from 603-608 and compresses collected information (at 609). The controller sends data to the manager (at 610), and repeats the input collection process.

Feature Extraction

According to one embodiment, the present system and method extracts key features and/or metadata from the crawled data. For example, packets are streaming into the collector at multiple gigabits per second speeds. The collector extracts a set of features on a flow-by-flow, or a host-by-host basis from millions of packets per seconds and tens of thousands of flows per second, and sends the extracted data to the manager in less than a few hundred bytes per second per flow. In one embodiment, a flow is defined by the 5-tuple of (src1P, dst1P, srcPort, dstPort, protocol). The definition of a flow may be expanded to apply to other primitives such as application or other combinations of packet header fields (e.g., Layer 2 flows include source and destination media access control (MAC) addresses in the definition of a flow).

Examples of a flow-by-flow feature include, but are not limited to: Number of different HTTP2xx RESPONSE packets; Number of different HTTP3xx RESPONSE packets; Number of different HTTP5xx RESPONSE packets; Binary feature of whether IP Traffic is present; Number of different types of HTTP packets; Number of different types of DNS packets; Number of different types of DHCP packets; Binary feature of whether TCP_SYN was followed by TCP_SYN_ACK; Binary feature of whether DNS_Q was followed by DNS_SUCC_RESP; Binary feature of whether DHCP_REQUEST was followed by DHCP_GRANT; Set of source/destination MAC addresses present in the flow; Each of the above features on a time slice by time slice basis (e.g., every 10 seconds of a flow); Mean, median and variance of packet inter-arrival times, payload sizes; Flag indicating whether window scaling was requested; Number of TCP FIN packets seen.

Examples of a host-by-host feature include, but are not limited to: Number of different hosts a particular host interacts with; Set of hosts that interact with each other; Number of ports used for transactions (indicates server vs. client).

Examples of application-level metadata include, but are not limited to: HTTP response and page load times; Voice and video call MOS scores; Response times of other protocols (DNS, DHCP, RADIUS, and the like).

Small raw data (e.g., statistics, topology) can be compressed and sent to the manager. However, intelligent feature extraction is required to send a large data to the manager. An example of a large data is statistical data (e.g., average link utilization). Similarly, the performance test results might be reduced down to specific features (e.g., average HTTP response time, presence of an anomaly in the performance test).

EXAMPLES

Figure 8:
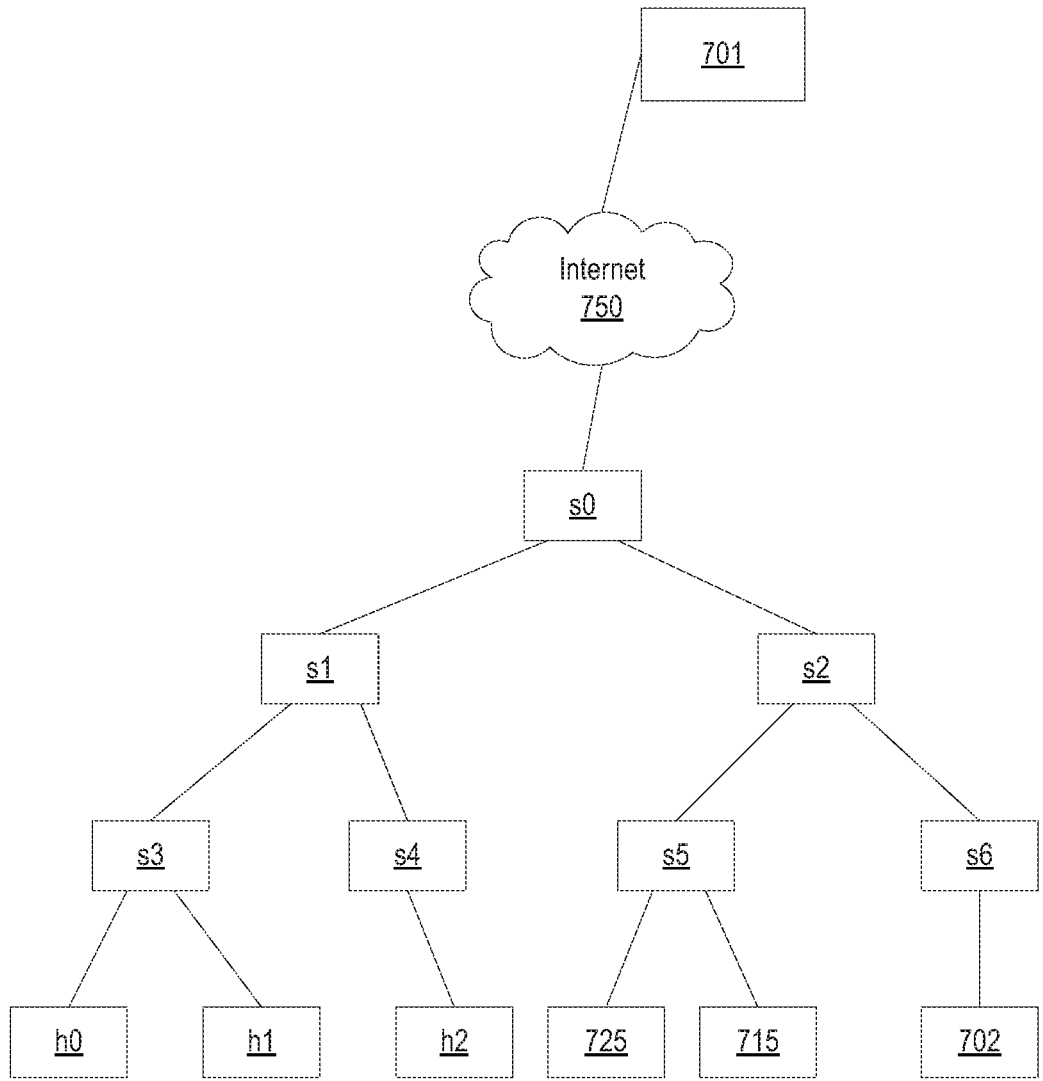
FIG. 8 illustrates a diagram of an exemplary network, according to one embodiment.

FIG. 8 illustrates a diagram of an exemplary network, according to one embodiment. Seven switches s0-s6 and network elements h0-h2 are arranged hierarchically. The top switch s0 is connected to the Internet 750, and a manager 701 is deployed in a server in the public cloud and connected via the Internet 750. A collector 702 is deployed as a virtual machine (VM) on a server attached to switch s6. The switches s0-s6 are switches and a controller 715 is deployed as a server attached to switch s5. An active directory server 725 is also connected to switch s5.

Figure 9:
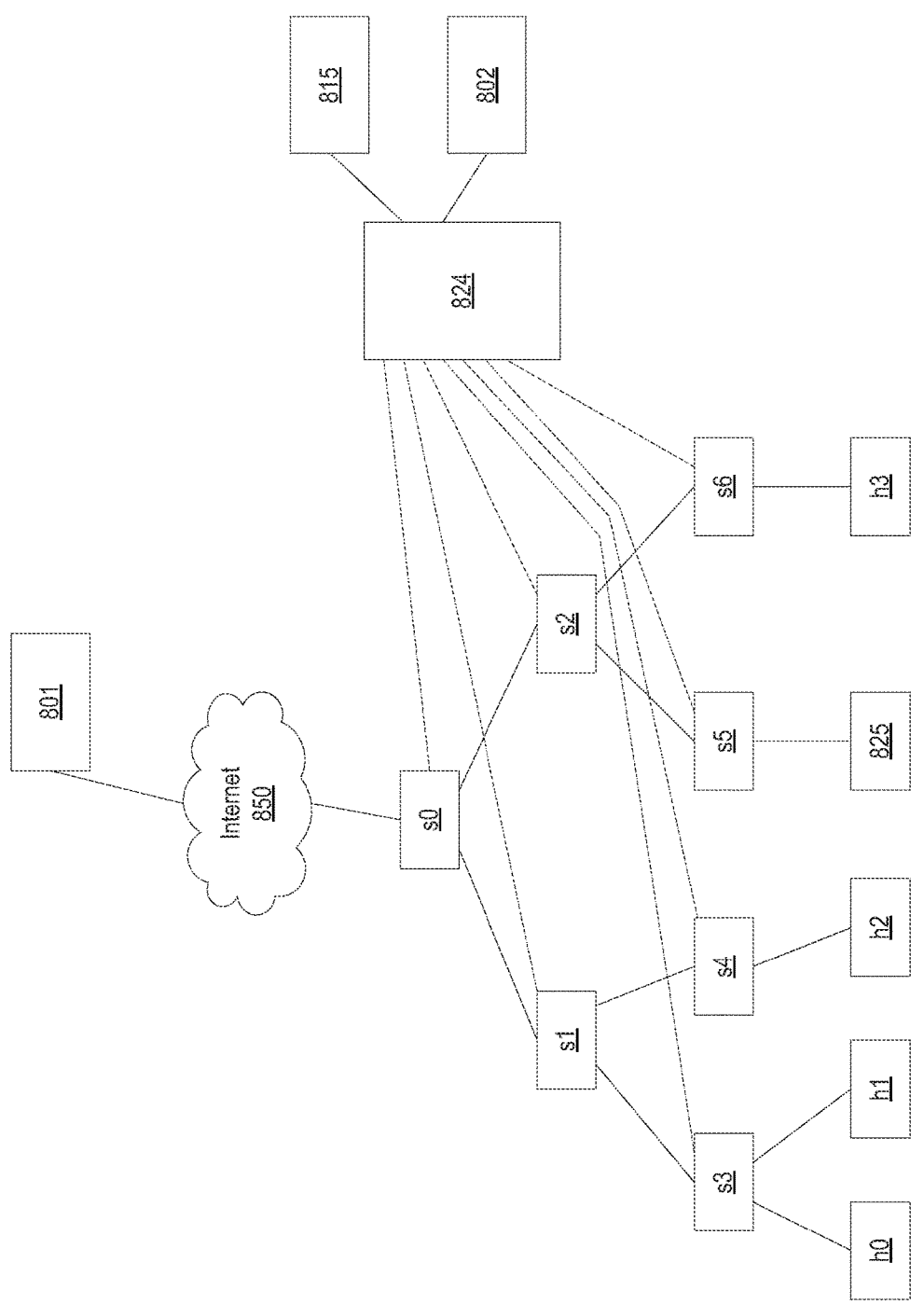
FIG. 9 illustrates a diagram of an exemplary of legacy network including a switch, according to one embodiment.

FIG. 9 illustrates a diagram of an exemplary of legacy network including a switch, according to one embodiment. Seven switches s0-s6 (and network elements h0-h3) feed mirrored traffic (as indicated by dotted lines) into a switch 824. The mirroring configuration is static, and as an example may simply mirror the traffic from each switch's uplink. The collector 802 and controller 815 are deployed connected to ports connected to the switch 824. The manager 801 is deployed in a server in the public cloud and connected to the switch s0 over the Internet 850. An active directory server 825 is also connected to switch s5. It is noted that mirror ports can be manually configured without the presence of a switch.

The collector 802 dynamically captures packets from multiple links in the network. As an example, the link to the collector is a 2 GBps link (e.g., 2 link-aggregated IGBps links), and other links (including the WAN link) are IGBps links. In this case, the manager may send a crawl schedule to the collector, for example: Collect the features on the WAN link (e0) 100 percent of the time, and Continuously cycle through links e3, e4, e5, e6 (i.e., certain of the depicted links) for five minute stretches, and collect all the features during that time.

Summarization and Indexing

Summarization and indexing functionalities are implemented in a manager, although it is possible to embed some or all of this functionality in a collector as well. The summarization and indexing processes take input features and other relevant data from the collector(s) and other systems. The first outputs of the summarization and indexing processes are higher-layer inferences, or bindings. Specifically, the relationship or binding of higher-layer data (e.g., users, applications, devices) to lower layer data (e.g., IP and MAC addresses, ports) is computed and indexed in a database. The present system and method provides a capability to query using natural language and high-layer control primitives, and any high-level indexed information, both current and historical.

The lower layer data may vary depending on an objective such as network visibility or network control. For network visibility, the lower layer data includes, but is not limited to, protocol level metrics and metadata. For network control, the lower layer data includes, but is not limited to, control primitives such as ports, MAC addresses, IP addresses, an access control list (ACL), quality of service (QoS), and rate limit setting. According to one embodiment, the present system and method predicts performance of one or more of an application, a user, and a device based on observed characteristics of the network around network protocol level metrics and metadata.

Figure 10:
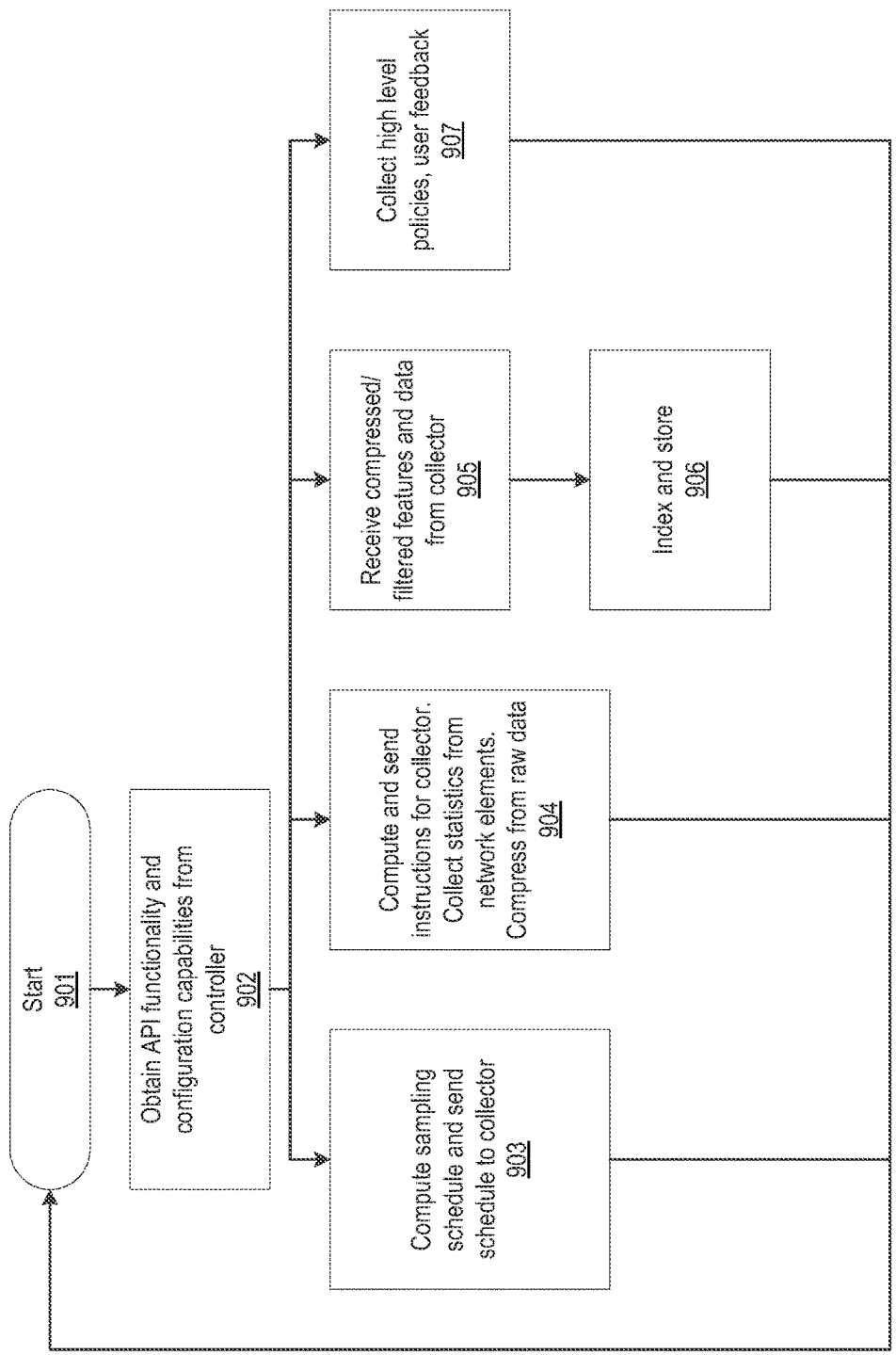
FIG. 10 is a flow diagram of an exemplary information collection process, according to one embodiment.

The main role of the summarization process is to store and learn from the inputs received from the collector(s) and other enterprise systems. FIG. 10 is a flow diagram of an exemplary information collection process, according to one embodiment. The collection process starts (at 901) as a manager obtains API functionality and configuration capabilities from a controller (at 902). The manager computes a sampling schedule as a function of a desired performance objective and topology and sends the sampling schedule to the collector (at 903). The manager also computes and sends instructions for the collector to interact with the controller and other enterprise systems, collect advanced statistics from network elements, and determine how to analyze, filter, and compress from raw data (at 904). The manager also receives raw compressed, filtered features, and other data from the collector (at 905), and indexes and stores the received raw features and data in a database in terms of using time, link and other aspects such as source IP address, as keys (at 906). The manager also collects high-level policies from user via a user interface and other policy engines, and user feedback to aid and improve a learning algorithm (at 907).

From the set of input features and relevant input data, the present system and method uses two background processes to summarize (i.e., extract higher-layer information) and index the summarized data. The incremental process acts upon the reception of any new raw (i.e., un-summarized) feature data or any data update that causes previously indexed information to be immediately erroneous (e.g., a user changed IP address). This process runs a heuristic classification algorithm to summarize the raw features. The second process is a global process that runs periodically to update a learning model (e.g., re-training the classification algorithm), as well as re-summarize past data. Examples of the higher-layer information include, but are not limited to: Users; Applications; Protocols; Device; Content; Network and Physical Location (Telemetry); and Derived metadata, including: Learned relationships between the above (e.g., User X tend to access applications of type Y, tend to generate Z amount of traffic), Learned attributes of the above (e.g., rate of change vs. "stickiness" of the relationships), Learned behaviors about the above (e.g., this application appears to be having TCP issues, this user appears to be doing something malicious), and Learned changes in behavior of the above (e.g., this application has had an abnormally high set of errors, this application is using abnormally high bandwidth).

The summarization and indexing de-duplicates data. For example, if multiple collectors send the same data, and the manager recognizes the duplication of data and disambiguates. In another example, if multiple collectors see the same information from the same enterprise system, the manager recognizes the duplicate information and disambiguates.

Figure 11:
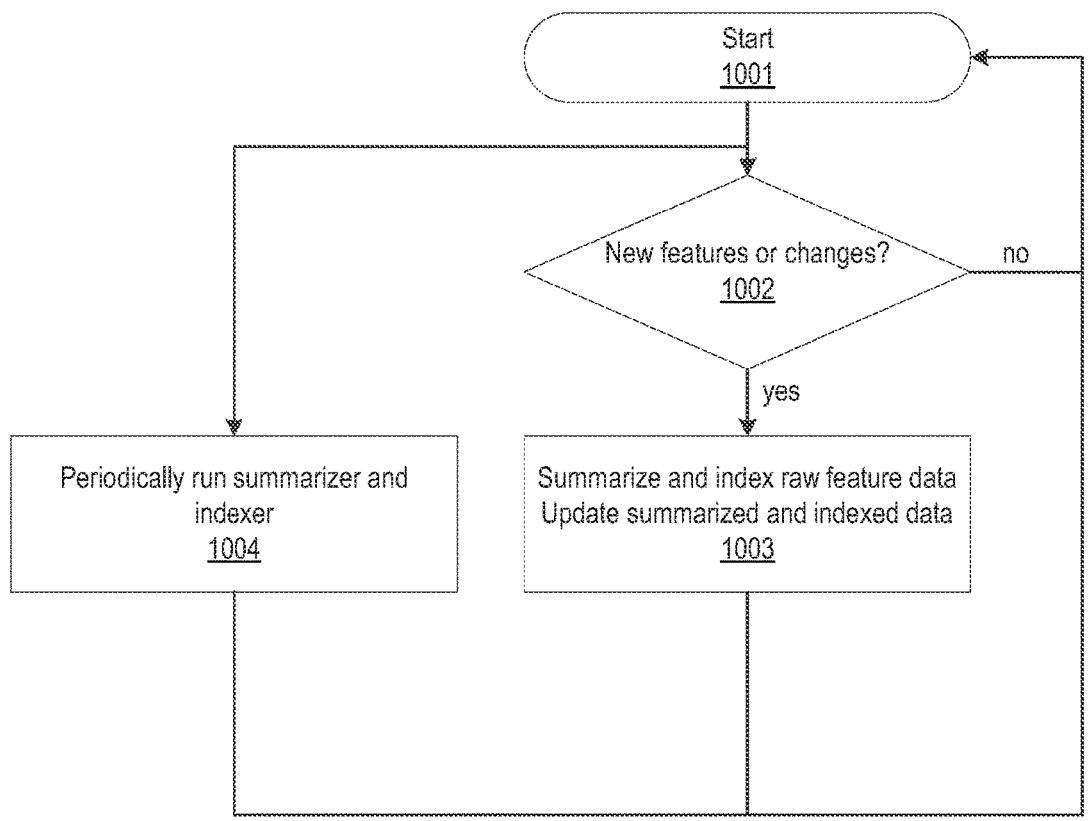
FIG. 11 is a flow diagram of summarization and indexing processes, according to one embodiment.

FIG. 11 is a flow diagram of summarization and indexing processes, according to one embodiment. The summarization and indexing process starts (at 1001) and the manager determines whether a new feature is received or there is a change in network topology, statistics, and user information (at 1002). The manager runs an incremental algorithm to summarize and index any raw feature data, and runs a re-indexer to update previously summarized and indexed data with changes of user or topology information (at 1003). A combination of processes is used to compute a higher-layer binding. The manager periodically (e.g., once per day) runs a global re-summarizer and re-indexer (at 1004). For example, the collector performs a deep packet inspection (DPI) to identify unencrypted application traffic, and the identified application is sent as a feature. Alternatively, the machine learning at the manager based on characterizing applications by the flow or host features described earlier can be used for encrypted traffic. User information and device information can be gleaned by accessing other enterprise systems such as active directory, extracting key information from packets (e.g., user agent string, organizationally unique identifier (OUI)), or examining network-topology (e.g., wireless traffic comes from where the wireless access points are located).

Another example concerns detecting application behaviors. For example, the machine learning at the manager can identify that the presence of certain packets (e.g., HTTP error packets) indicating certain types of errors. Similarly, a heuristic algorithm that takes into account the exact physical path the traffic takes can reveal other application behaviors. For example, packets are seen with increasing inter-arrival times as they pass through a particular switch; this indicates a congested or misconfigured switch. An example of the outputs of the heuristic algorithm is a probabilistically ranked list of higher-layer bindings.

According to one embodiment, training data is collected via user's labelling of data. For example, a user, via a cloud portal, specifies that a particular user or application issue occurred recently. In another example, the present system and method suggests a set of possibilities for a given query. The user specifying which, if any, of those possibilities is the correct one is a useful training data. Further generalizing this, the present system and method combines algorithm insights from multiple networks to further enhance the classification of the collected data.

According to another embodiment, the present system and method performs, in real time, a segment-by-segment analysis of a particular user/application/device's traffic. To do this, the present system computes the physical and logical links that the traffic of interest is taking, and alters the tapping schedule of the collector(s) so that they collect data (e.g., packets, stats) pertaining to the physical links. Finally, the resultant features are indexed and analyzed in a similar vein to normally collected features.

Another example of summarization and indexing is computing composite metrics from the raw features and computing and storing comparisons of these metrics across different dimensions. For example, the present system and method computes a device quality-of-experience metric from raw measures of response times, packet loss, etc., and compares the value of that metric against devices of the same or different type (e.g., iPhones), those with the same or different operating system (e.g., Android), those connected to the same access point, etc. The computed, stored and indexed information can be quickly retrieved via a user interface query. It can also be used for a closed loop control with a programmable controller. The programmable controller controls network elements. The network manager controls the network elements via the programmable controller.

Cross Network Learning

The manager located in the cloud has access to systems from multiple enterprises. For example, the present system is deployed as a multi-tenant system across customers. In such a deployment, no data is shared across customers, but the processes may be shared across customers.

An example of cross network learning is to train separate classifiers for computing higher-layer bindings from the extracted features of separate customer networks. The separate classifiers can be combined to come up with an overall better classification (e.g., majority wins). Another example of cross network learning is learning the most common queries across networks and dedicating a higher compute power to have a better answer for those particular queries.

Another example of cross-network learning is based on different system deployments that interact with each other. For example, the present system is deployed at customer network 1 and customer network 2 that send a lot of traffic to each other. The present system and method automatically detects the heavy traffic, and runs a more advanced performance testing algorithm directly between the collectors on both customer networks.

Another example of cross-network learning is for predicting higher-layer performance based on observed lower-layer characteristics of the network and applications. For example, suppose that on one network, the present system learned that high AP channel utilization results in a jitter resulting in poor real-time video application performance. The present system detects the presence of high AP channel utilizations to predict poor performance for another network that may or may not have yet deployed a real-time video application.

Query-Ability

According to one embodiment, the present system and method provides natural language query-ability of the network. The manager has a query box that takes natural language type input regarding the network and its users/applications/devices/behaviors. Examples of natural language queries are: "User X is having problem Y with application Z," "User X is experiencing slowness with salesforce.com," and "Tell me about the SAP application."

The present system and method responds to the queries and presents a probabilistically ranked list of answers, along with the probabilities/confidence for each answer. The present system and method also presents deeper supporting evidence if requested by the user.

Summary and Example

The manager receives feature data from one or more collectors at various levels, for example, a flow level, host level, user level, and link level. The manager collects and indexes the collected data in terms of flow, host, user, link, and time intervals. As a flow of feature data arrives, the manager runs an incremental process to classify (a) an application that the flow corresponds to, (b) any interesting behaviors that the application underwent (e.g., failure to connect to a server, slow, errors), (c) a user involved in using the application, and (d) the devices involved in using the application. Additionally, the manager ties topology knowledge to an application (e.g., the location of an application server, network links that the application traffic traverses). This information is indexed along with each feature. The collector automatically runs performance tests on detected or configured application servers, for example, running ping tests to the application servers. The performance test results are also indexed along with the applications and features.

According to one embodiment, the present system and method provides a query interface (e.g., Internet interface) to a user. The user enters a query, for example, in a natural language form, into the user interface of the present system. For example, a user's query is "tell me about application X." The present system proceeds to perform the following steps:
  i. Query the indexed database for (a) the location of the application (e.g., on-premise, in a cloud), (b) users who were using the application over the last few hours, (c) the behaviors of the application, (d) the bandwidth that the application was using.
  ii. Display the results of (i).
  iii. Compute the links that have carried the application traffic over the last day. Send a command to the collector to immediately collect a ten-second sample of all traffic on all of the links. Send commands to the programmable network element (e.g., via a controller) and forward the traffic from the links to the collector.
  iv. Augment the previously displayed results with those found in (iii).

Another sample query may state, "user X is having problem Y with application Z" (i.e., tell me about it). The manager proceeds to perform the following steps:
  i. Query the indexed database for flow instances where user X was using application Y. Of the behaviors recorded, rank-order the potential problem behaviors. Compare the corresponding features across links along network paths. Compare the features across time (i.e., historically).
  ii. Display (i).
  iii. Compute the links that have carried this user's application traffic over the last day. Send a command to the collector to immediately collect a ten-second sample of all traffic on all of these links Send commands to the programmable network element (e.g., via a controller) to forward the traffic from those links to the collector.
  iv. Augment the previously displayed results with those found in (iii).

Control

According to some embodiments, the present system and method involves using the visibility of the network and controlling the network. An example of controlling the network is enforcing a higher-layer policy throughout the network. Another example is automatic problem and security/anomaly/performance remediation where applicable. The present system and method may implement a network control in (a) a manual, or prescribed control, and (b) an automatic closed loop control. In both cases, one of the distinctions from the visibility perspective is that the binding of a higher-layer policy or a control objective needs to be tracked to the specific low-layer control primitives that the underlying network elements can be programmed with. Examples of the high-level control objectives include, but are not limited to: Block user X from accessing the network, Maintain high performance for Application Y, Detect and mitigate denial of service (DOS) attacks, and Prioritize user class Z traffic.

For a manual/prescribed control, the control instructions that achieve a high-level objective are computed and presented to the user, but not automatically programmed into the network elements. In addition, specific network elements that require a new or updated configuration based on the control instructions are computed as a function of network topology and presented to the user. The present system computes how the control is to be achieved in a distributed manner. The control instruction sets may be probabilistically ranked in the order of predicted effectiveness. While an explicit machine-to-machine programmability (e.g., controller) may not be required in some embodiments, it may be required for the present system to discover the configuration state and capabilities of the various network elements in other embodiments. The present system takes into account specific low-level control primitives that the network elements can be configured with. For example, many network elements have IP, MAC, and TCAM hardware tables of different sizes that are programmable with different primitives.

According to some embodiments, the disclosed system and method dynamically tracks the bindings between a user and the network (IP address, MAC address, physical port) as a user changes devices, plugs into a different sub-network, and receives a new IP address from a dynamic host configuration protocol (DHCP) server. According to some embodiments, the present system and method binds an application/network performance issue to specific traffic forwarding decisions (e.g., application slowness is caused by a set of particular source/destination IP address pairs that are highly utilizing a particular link) or a network configuration (e.g., a misconfigured maximum transmission unit (MTU)). According to some embodiments, the present system and method ties a particular anomalous traffic behavior to a specific user/application/device, and further to particular IP/MAC addresses.

According to some embodiments, the present system and method takes into account the topology and capabilities of the underlying network hardware. For example, if one is trying to use a pure layer 2 switch to enforce a user policy, it would be required to dynamically track the User→MAC address binding, and use only MAC addresses for programming rules into the switch. An example of taking the topology into account, the present system and method tries to enforce a policy as close to the edge of the network as possible, which current firewalls, usually deployed inline at logical or physical network choke points, cannot do. The rules programmed to the network elements can be changed in a closed loop manner when the higher-layer to lower-layer bindings change.

Figure 12:
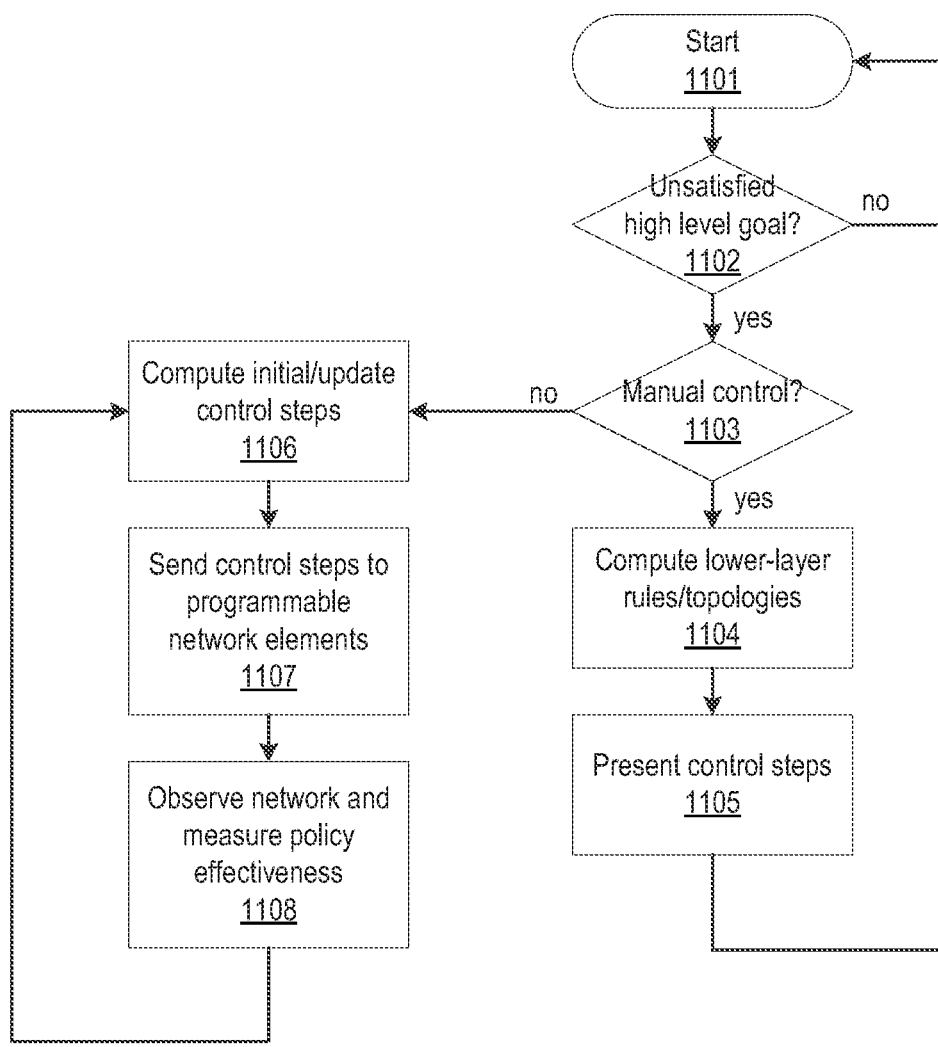
FIG. 12 is a flow diagram of a control loop, according to one embodiment.
Figure 13:
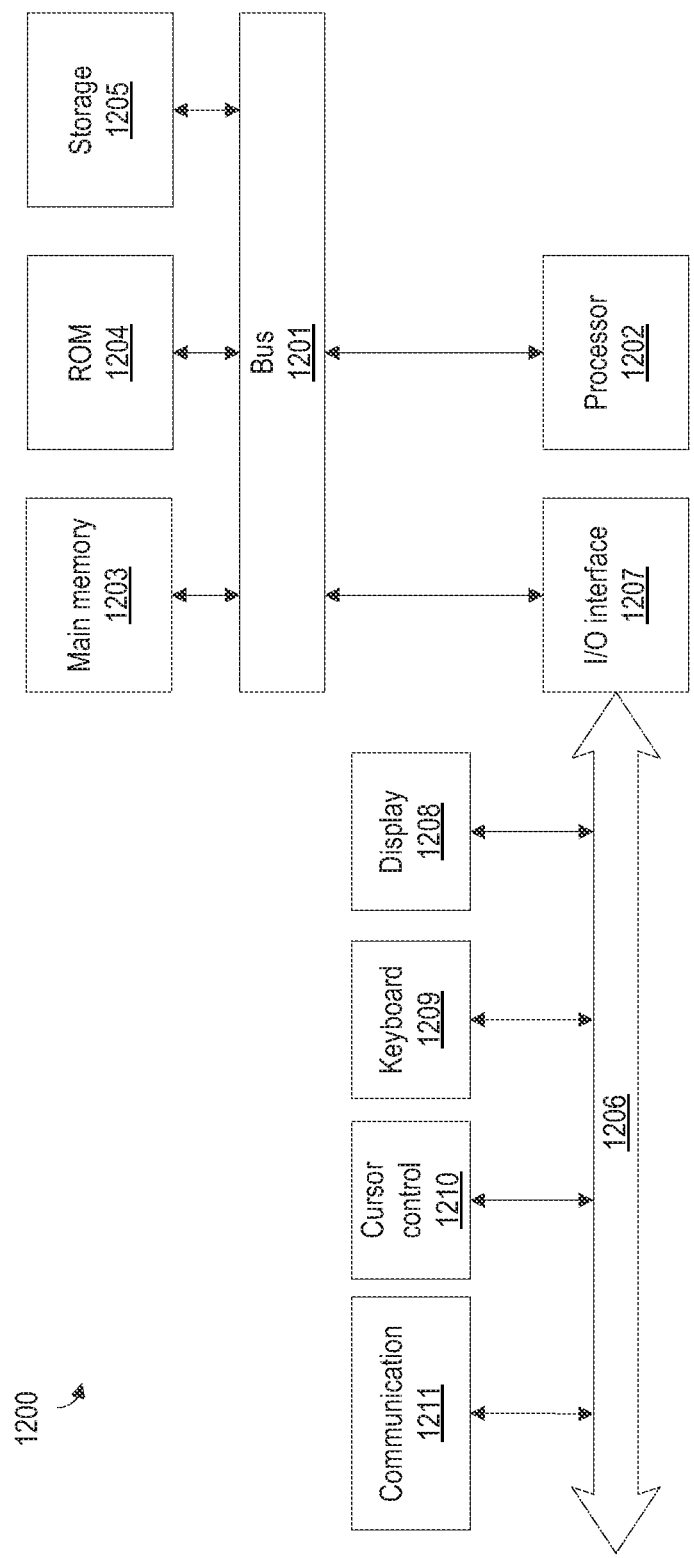
FIG. 13 illustrates exemplary computer architecture, according to one embodiment.

FIG. 12 is a flow diagram of a control loop, according to one embodiment. The control loop starts (at 1101), and the manager determines whether there are unsatisfied high-level control objectives (at 1102). The manager branches off based on a control method (at 1103). For a manual control method, the manager computes the optimized lower-level rules and topologies to send to the network controller base on, but not limited to, 1) the high-level control objective, 2) estimated higher-layer bindings values and associated uncertainties, 3) configuration capability and current configuration of underlying network elements, and 4) other information such as network topology, statistics, tolerable configuration changes (at 1104). The manager presents the control method of specific network elements to achieve the high-level control objective to the user (at 1105). For an automatic control, the manager computes the initial update control to the programmable network elements based on, but not limited to, 1) the high-level policies, problems, security requirements, anomalies, 2) estimated higher-layer parameter values and associated uncertainties, 3) configuration capability and current configuration of underlying network elements, 4) other information such as network topology, statistics, tolerable configuration change, 5) measurement of effectiveness of the control policy, and 6) control loop parameters such as stability, oscillation, timescale (at 1106). The manager sends the control policy parameters to the programmable network elements (at 1107), and observes the network and measures effectiveness of the control policy with respect to the high-level policy (at 1108).

As an example of manual/prescribed control, the present system and method enforces a high-level objective of blocking user X from the network. To do this, the present system and method first derives the IP addresses that user X corresponds to. Then, the present system and method computes a logical choke point to apply the policy effectively. For example, the logical choke point corresponds to the routers on the subnets of user X's IP address. The output of the present system includes a set of commands at each of the routers that results in the traffic from/to those IP addresses being dropped. An alternative output is a set of commands to a controller to implement a desired control.

For an automatic control, the present system and method programs the network elements in a closed loop manner to achieve and maintain a high-level control objective. The automatic control is based on an inherent assumption that the underlying network has programmable network elements. In addition to the binding of higher-layer objectives to low-layer programmable primitives and taking into account the configuration state and capabilities of the underlying network elements, the present system and method computes a dynamic control loop. The present system and method first applies a possible control (e.g., a gain) and checks to see if a high-level objective is achieved. If so, the present system and method backs off the remediation and/or applies a different but lighter remediation and checks again to see if the high-level objective is still achieved. If not, the present system and method attempts to apply a heavier control and/or re-diagnose the higher-layer objective to low-layer control primitives binding and apply a different control. This procedure is also depicted in FIG. 12. The first step of the closed loop control may be different from the steps provided by the manual control. Additionally, factors such as stability, oscillation and timescale of response may be taken into account in the setup of the control loop.

The automatic closed loop control can be applied to the example of blocking user X from the network. In this example, the present system and method programs rules to drop traffic from/to user X's IP address(es) at the routers in the network. Assuming that works, the present system and method tries to program only user X's default gateway router with a rule. If it fails, the present system and method applies more rules to other routers and/or blocks certain ports and continues. When the user X comes in on a new IP address(es), the present system and method automatically adjusts to the changed network topology.

Another use case of an automatic closed loop control is where the control objective is to maintain high performance for application X. In this case, the present system and method simply programs rules that place all traffic corresponding to that application into the highest performing queue. If improved application X performance is not observed, the present system and method attempts to program rules that re-route or rate-limit traffic from applications that share common network links with application X. If improvements are observed, the present system and method restores the performance of other applications.

An example of a higher-layer policy (for manual or automatic control) is "Prioritize traffic from employees using business applications such as Salesforce.com or Workday, over casual traffic such as traffic from guest users using a different set of applications." To implement this higher-layer policy, the present system and method dynamically tracks the session 5-tuples for these combinations, and computes a minimal set of rules necessary for the enforcement, and dynamically tracks and programs.

According to some embodiments, the present system and method automatically provides remedies to network problems. For example, a user enters in a query of the form "user X is having problem Y with application Z," and the present system and method provides the top-ranked answer (i.e., the answer with confidence greater than a certain threshold) that "there is congestion on common network links caused by users using application W." If automatic remediation is enabled for this particular query, the manager sends instructions to the collector to command the controller to tell the appropriate network elements to (a) prioritize user X→application Z traffic over other traffic, or (b) disallow traffic involving application W. The (b) remediation approach may require additional policy permission from the operator due to the restrictive nature of the traffic disallowing policy.

Referring to FIG. 5 as an example of the remediation process, suppose that user X is "attached" to switch s3 and that application Z server is "attached" to switch s4. The policy to prioritize user X→application Z traffic may be applied by the controller that sends rules to switch s3 that matches user X's IP address (as source IP) and the application server IP address (as destination IP), and has an action that marks the IP diffserv code point (DSCP) bits to represent the highest class of service. Similarly, the reverse rule is applied to switch s4 (i.e., with the source and destination IP addresses flipped).

Alternatively, the rules may be applied to all switches along the communication path. These rules have similar match fields, but the action field directly sends the traffic to the highest priority queue. If the policy is to drop user X→application Z traffic, the rules are applied to the edge switches s3 and s4, respectively. This is a useful technique since the rules do not need to be applied everywhere in the network.

Another example of the automated remediation process is in the configuration domain. For example, for a query "there is a problem with application X," suppose that the top-ranked answer is "the problem appears to be that switch Y is dropping packets due to a misconfigured maximum transmission unit (MTU) value." The present system and method remediates this situation automatically by sending instructions to the collector to command the controller to reconfigure the MTU value of the appropriate switch.

According to some embodiments, one of the applications of turning visibility into control is a full-fledged distributed firewall. For example, the operator sets up a policy "user X cannot access application Y," or "user X may be barred from the network for Y minutes after Z failed logon attempts." In another example, the operator sets up a policy to isolate (e.g., on a quarantine VLAN®) a user whose traffic exhibits malicious or anomalous behavior. The detection and manual or automatic remediation of an anomaly (e.g., a detected DOS attack) can also be addressed within the control framework of the present system and method.

FIG. 1 illustrates an exemplary computer architecture that may be used for the present system, according to one embodiment. The exemplary computer architecture may be used for implementing one or more components described in the present disclosure including, but not limited to, the present system. One embodiment of architecture 1200 includes a system bus 1201 for communicating information, and a processor 1202 coupled to bus 1001 for processing information. Architecture 1200 further includes a random access memory (RAM) or other dynamic storage device 1203 (referred to herein as main memory), coupled to bus

1201 for storing information and instructions to be executed by processor 1202. Main memory 1203 also may be used for storing temporary variables or other intermediate information during execution of instructions by processor 1202. Architecture 1200 may also include a read-only memory (ROM) and/or other static storage device 1204 coupled to bus 1201 for storing static information and instructions used by processor 1202.

A data storage device 1205 such as a magnetic disk or optical disc and its corresponding drive may also be coupled to architecture 1200 for storing information and instructions. Architecture 1200 can also be coupled to a second I/O bus 1206 via an I/O interface 1207. A plurality of I/O devices may be coupled to I/O bus 1206, including a display device 1208, an input device (e.g., an alphanumeric input device 1209 and/or a cursor control device 1210).

The communication device 1211 allows for access to other computers (e.g., servers or clients) via a network. The communication device 1211 may include one or more modems, network interface cards, wireless network interfaces or other interface devices, such as those used for coupling to Ethernet, token ring, or other types of networks.

FIG. 1 illustrates system architecture of an exemplary network incident identification and analysis system 1300 deployed in an enterprise network, according to one embodiment. The system 1300 includes a manager 1310 that is located in a cloud server 1325. The cloud server may reside in a public or private cloud. The system 1300 also includes one or more collectors 1320 that send data to the manager 1310. In one embodiment, the collector 1320 is a software appliance (virtual or physical) that is located "on-premise" (i.e., on the premise of the enterprise network), and not at a remote Internet-linked location. In this embodiment, the collector is logic in a non-transitory computer readable memory that is executed by a processor to perform the actions described herein. In other embodiments, the collector is a combination of hardware and software. The collector receives live packets captured directly from physical and/or virtual network elements. The collector also receives data (e.g., topology, statistics, user information, and the like) from other enterprise systems including identity management systems, network element controllers (e.g., controllers, network management systems), and the like. In some embodiments, the collectors 1320 transmit the data obtained from physical and/or virtual network elements of the enterprise network directly to an analytics system 1330 of the system 1300 (located remotely) for further examination. In some embodiments, the analytics system 1330 is a subcomponent of the manager 1310 and is located in the cloud server 1325. In some embodiments, the manager 1310 in combination with the analytics system 1330 runs the algorithms for identifying, analyzing, and remediating network incidents from cross-company real-time network data.

Figure 14:
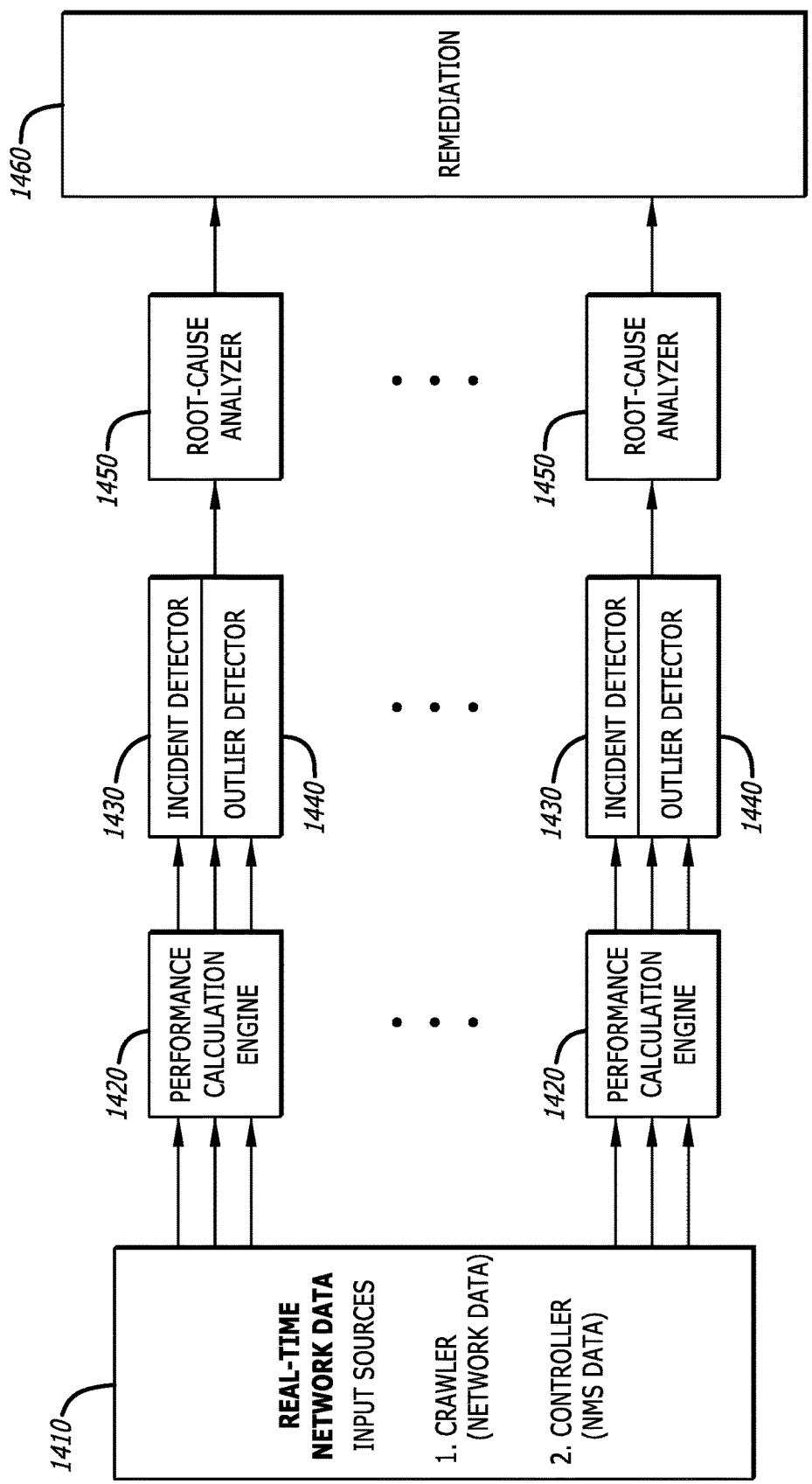
FIG. 14 illustrates a logic flow diagram of a client network incident identification, analysis, and remediation system and method for cross-company real-time network data analysis.
Figure 15:
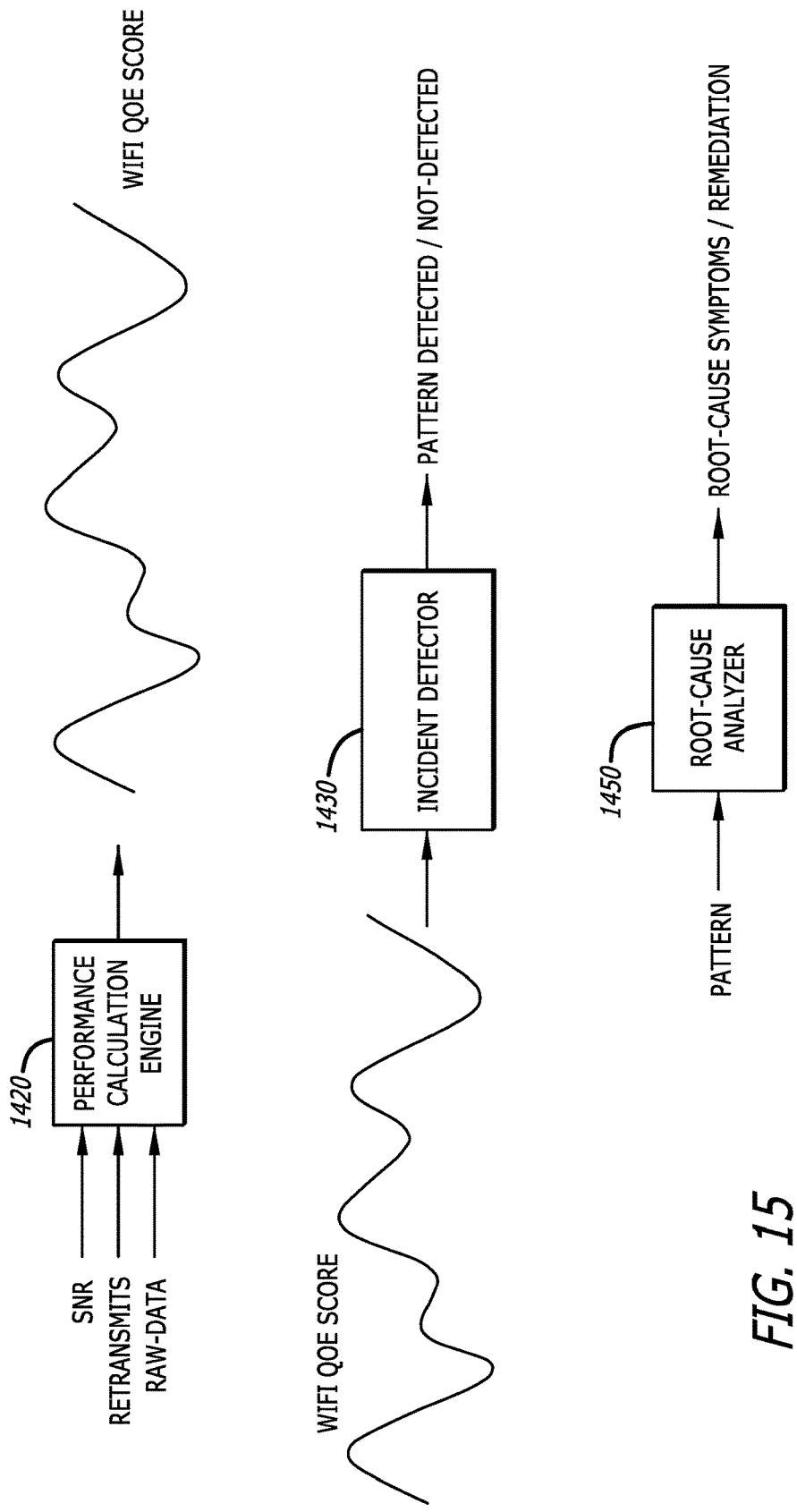
FIG. 15 illustrates a more detailed logic flow diagram of a client network incident identification, analysis, and remediation system and method for cross-company real-time network data analysis.
Figure 16:
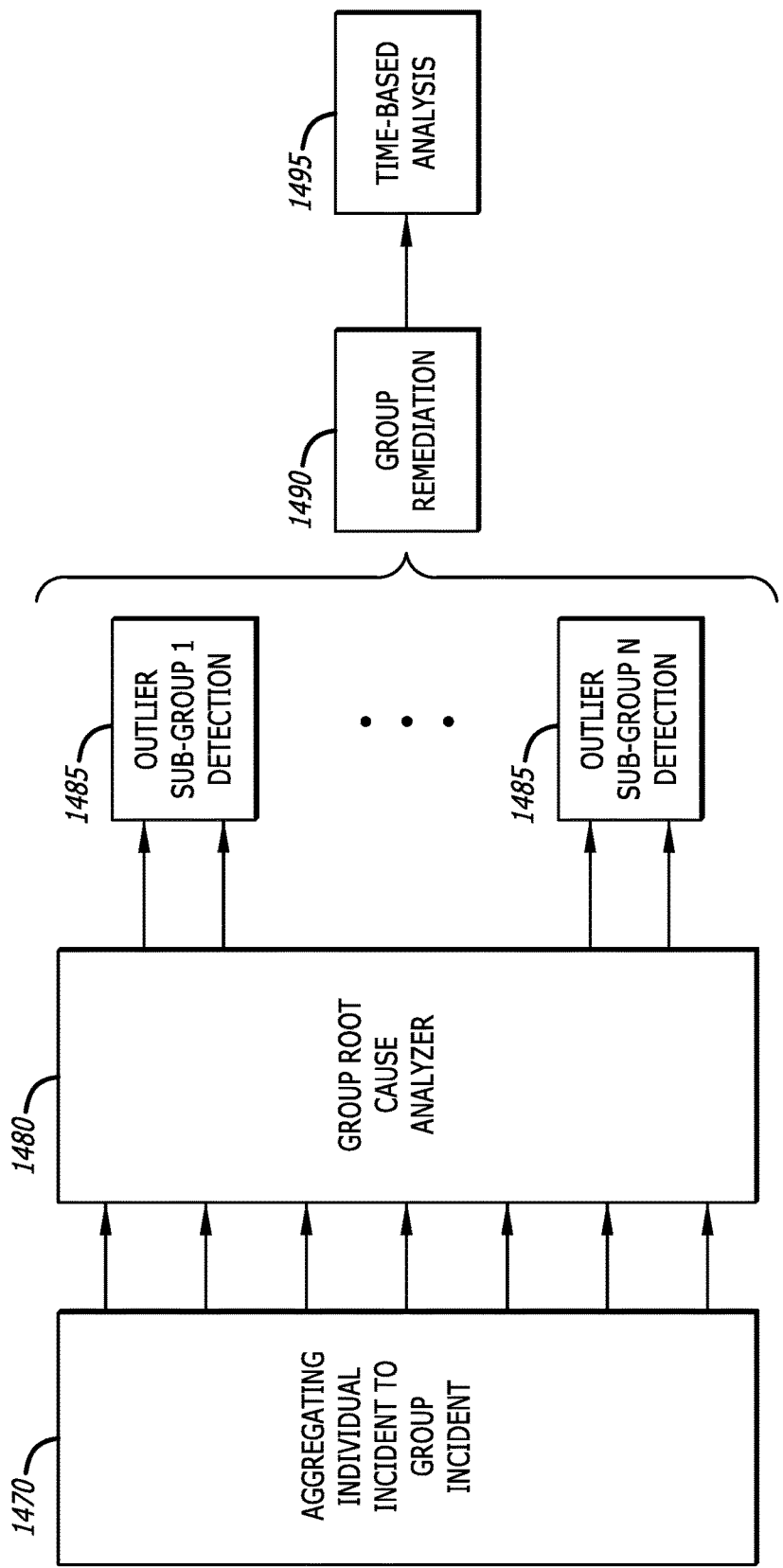
FIG. 16 illustrates a logic flow diagram of a group network incident identification, analysis, and remediation system and method for cross-company real-time network data analysis.

Identifying, Analyzing, and Remediating Network Incidents from Cross-Company Real-Time Network Data:

Referring now to FIGS. 14-16, the network incident identification and analysis system disclosed herein is directed towards (1) receiving real-time network data (at 1410) and executing performance calculations (at 1420), (2) computing client and/or infrastructure incidents from the real-time network data (at 1430), (3) performing outlier detection of the incidents (at 1440), (4) finding the root causes of the incident pattern (at 1450), (5) automatically determining (and implementing) a proper remediation of the identified incident pattern (at 1460). Some embodiments of the network incident identification and analysis system also include aggregating those network incidents for a group of clients/infrastructure (at 1470), mapping the network incidents to group root causes (at 1480), and automatically determining and implementing the proper group remediation at (at 1490). Additionally, some embodiments of the network incident identification and analysis system include detecting outlier subgroups within those network incidents (at 1485), finding deviations within those network incidents, prioritizing the deviations, and comparing the network incident across the current company and other "similar" companies. Moreover, further time-based analysis of the network incident may be performed using embodiments of the network incident identification and analysis system (at 1495).

The network incident identification and analysis system examines multiple sources of real-time input network data, including: (1) metadata gleaned from deep packet analysis of real network traffic; (2) data from existing network elements, such as wireless controllers, access points, and the like (3) data from other on-premise systems, such as Microsoft Lync servers, and the like.

This combined real-time data is received into the network incident identification and analysis system, where the data is time-aligned, such that for every time T (for individual clients), there is a record of client data including: (1) Device/OS information; (2) Wireless metrics, such as SNR, packet loss/retransmits, connected Access Point, Channel Utilization at the AP, and the like; (3) L2-L4 information such as VLAN, receiver/transmitter bytes/packets, DSCP, TCP latency/retransmits, and the like; (4) Network services related L7 information such as DHCP, DNS, and RADIUS protocol info and response times; (5) L5-L7 information such as SSL Certificate, hostnames, HTTP response times; and (6) Application ID for detected applications such as Skype, SaaS applications, and the like.

In another aspect of the network incident system, the data is time-aligned, such that for every time T (for access points and wireless LAN controllers), there is a record of wireless information such as: (1) Detected noise and interference levels on each channel; (2) Information about neighboring APs and topology; (3) CPU/Memory utilization, reboots, and the like.

In some embodiments of the network incident identification and analysis system, where data is pulled from other on-premise systems, there could be additional client and/or infrastructure information for every time T, including: (1) UC systems (e.g., Microsoft Lync) call quality records including client MOS scores, jitter, packet loss, abnormal call terminations, and the like; (2) CPU/Memory utilization information from DHCP, DNS, RADIUS servers, as well as other network elements; and (3) Netflow/Sflow/SNMP records from Routers, switches, and the like. NetFlow is a network protocol for collecting IP traffic information and monitoring network traffic to analyze flow data and create a picture of network traffic flow and volume. sFlow is a network traffic measurement system technology that is embedded in a network device and provides continuous statistics on any protocol (L2, L3, L4, and up to L7), thereby enabling traffic throughout a network to be accurately characterized.

Referring now to pattern analysis of individual network incidents, in the network incident identification and analysis system, a network incident is defined as a client, infrastructure network, or application issue that may occur in the environment. Examples of these kinds of issues, affecting an individual client or server or network element include: (1) "Client had poor Wi-Fi performance;" (2) "Client could not connect due to RADIUS issues;" (3) "Access point had more 5 GHz Capable Clients connecting on 2.4 GHz;" (4)

"RADIUS server had outages;" (5) "DNS Infrastructure issues affected client;" (6) "Client have service interruptions due to excessive SSID transitions;" (7) "Client had poor Internet performance;" and (8) "Client did a TCP/UDP Port Scan."

Notably, when analyzing these network incidents, the network incidents often may be divided into "client type" incidents (i.e., incidents that involve the experience of a client), and "infrastructure type" incidents (i.e., incidents that involve the experience of an infrastructure element). Additionally, some network incidents may relate to a generic issue that is performance related (e.g., client could not connect to the network) or even security related (e.g., detected abnormal client behavior, such as a port scan).

For each of above described network incidences, the network incident identification and analysis system performs a mathematical analysis that involves inspecting for a pattern of parameters that persist over a period of time. In one example of a performance metric that persists over time, this type of incident may be detected by first evaluating a time series performance metric X(t) that would be evaluated on a "time instant by time instant" basis, based on other metrics present at that time instant. Next, the incident is detected over a longer period of time T as the condition of X(t) is less than some threshold q for a certain proportion of T. In one embodiment, the period of time is 10 minutes. In other embodiments, the period of time may be 1, 2, 5, 20, or 30 minutes.

In a first example, the network incident identified is that the "Client had poor Wi-Fi performance." In this scenario, X(t) represents Wi-Fi performance based on other metrics like SNR, L2 Retransmits/Packet loss, amount of data transmitted, etc. In a second example, the network incident identified is that the "Access point had more 5 GHz Capable Clients connecting on 2.4 GHz." In this scenario, X(t) reflects an indicator of the presence of the number of 5 GHz capable clients connecting to the 2.4 GHz Access Point Radio exceeding by Q percent, the number of 5 GHz capable clients connecting to the 5 GHz AP radio.

In another implementation, the network incident identification and analysis system also performs a mathematical analysis that involves inspecting for a pattern in a sequence of metrics/events that exhibit over time. This type of network incident may be detected by looking for a sequence of events {E} that manifest over a time T. In a first example, the network incident identified is that the "Clients have service interruptions due to excessive SSID transitions." In this scenario {E} would be the sequence of at least M "back and forth" SSID transitions for a particular client within a period of time T. In this example, in "incident occurrence at time t" is defined as a network incident that was detected over the time period between t−T→t.

Additionally, for any network incident there is a "group" version of the "individual" incident (which is described in greater detail below). The "group" version of an incident refers to the number of affected clients/infrastructure out of total number of clients/infrastructure. For example, "100 out of 1000 clients had poor Wi-Fi performance" would imply that out of 1000 clients that were using the Wi-Fi network, 100 of them had poor Wi-Fi performance.

Root cause analysis of individual network incidents, once a network incident is detected for an individual client or infrastructure element by the network incident system and a pattern has been determined, the root cause is then established by measuring a vector of "symptoms" that manifested at the same time instances as when the incident was occurring. These "symptoms" are specific relevant factors that explain causation of why that incident was occurring.

In one implementation, {K} is the set of time instances (out of the total period T) when the individual client or infrastructure element experienced the incident. Continuing in this implementation, {S} is the set of "symptoms" that are relevant to the particular incident in question. For each symptom s_i in {S}, the network incident identification and analysis system evaluates the correlation of s_i based on the percent of time instances K where the symptom manifested itself, as well as the corresponding values of the symptom at those instances. Additionally, {CS} is defined as the vector of correlation values for each symptom.

In the next portion of the root cause analysis, the {CS} vector is mapped to a set of potential root causes based on the value of the correlations first "thresholded," and then translated in a remediation database. An example of this process is provided below for a network incident in which the "Client X had poor Internet performance." In this example, the network incident identification and analysis system measures poor Internet performance by noting that HTTP response time was greater than "X" for over "Y" percent of the time "T" (e.g., see incident calculation).

The system tracks measured symptoms {S} during time instances {K} when the client was experiencing poor Internet performance:
  (1) HTTP symptoms: HTTP response time greater than A, and the like.
  (2) TCP symptoms: TCP latency greater than B, TCP retransmits greater than C, TCP window size less than D, and the like.
  (3) DNS symptoms: DNS Latency greater than E, DNS drops greater than F, Unauthorized DNS Server used, and the like.
  (4) Wi-Fi symptoms: SNR less than G, L2 packet loss/retransmits greater than H, Client roaming event, AP Noise greater than I, AP Channel Utilization greater than J, and the like.

In this scenario, an example root cause result identified by the network incident system is "poor Internet performance caused by Noise at Access Point." This root cause result was based on the factors (1) HTTP response time greater than A, (2) SNR less than G, and (3) AP Noise greater than I, which each manifested themselves over Z percent of the {K} bad time samples. Additionally, the amount that a symptom deviates from the normal/good value is also taken into account when deciding its contribution to a root cause result. In this manner, the set of potential root causes is aggregated and presented as the overall potential root causes for the specific Incident occurrence.

Referring now to group incident computation and group root cause mapping, some embodiments of the network incident identification and analysis system also include ability to: aggregate network incidents for a group of clients/infrastructure, map the network incidents to group root causes, and automatically determine and implement the proper remediation. Regarding the grouping aspect of the system, in one implementation for a given time period T (once all of the individual client or infrastructure network incidents are detected), all of the individual client or infrastructure network incidents that have occurred are categorized into a "group incident occurrence" (once all of the individual client or infrastructure network incidents are detected). An example of a "group incident occurrence" would be "Between LOAM-11 AM on Jan. 1, 2016, 150 out of 1000 clients had poor Internet performance." This group incidence occurrence says that during the time T (i.e., 10

AM-11 AM on Jan. 1, 2016), 150 clients had the individual incident of having bad Internet performance, whereas 850 other clients that were also using Internet did not have bad Internet performance.

Next, regarding the outlier analysis aspect of the system, the group incident occurrence is analyzed for the presence of any "outlying subgroups." An outlying subgroup is determined by first partitioning the total number of clients according to some grouping (e.g., by AP-Group, AP, generic Location, device type and/or OS, radio channel, and the like). Next, particular sub-partitions are identified as an outlying subgroup if the percent of affected clients is "much higher" than the overall percent of affected clients and infrastructure. In this regard, the threshold values for "much higher" may be defined statistically, by assuming a binomial distribution for the number of clients being "affected" within any subgroup, and looking for the probability of a subgroup having a particular number of affected clients higher than X.

In one embodiment of the network incident identification and analysis system, an example of an outlying network incident subgroup is a particular AP-Group X, during the same time T, having 120 out of 150 clients experience poor Internet performance. This outlying network incident subgroup implies that the percent of affected clients in AP group X is 80 percent, even though the overall percent of affected clients is only 15 percent. According to a binomial distribution, the probability of this occurring is infinitesimally small, and thus, AP group X would be flagged as an outlying subgroup within this incident.

Regarding the group root cause analysis aspect of the system, a clustering analysis is implemented that uses correlation vectors of the individual affected clients (i.e., $\{CS\}\_i$ for each client "i"). Accordingly, the network incident identification and analysis system can determine a distribution of systemic root causes that affects different groupings of the overall set of affected clients, by first clustering these affected clients and mapping them to a root cause together. Notably, the examples discussed above describe a client group incident, although the same analysis would be performed for a group network incident with respect to infrastructure elements (i.e., for infrastructure network incidents).

Regarding the prioritization aspect of the system, after a group incident is detected, the network incident identification and analysis system then prioritizes (in terms of importance) the network incident. The prioritization is performed based on many factors that may include: (1) percent of clients affected by the incident; (2) presence of important users as part of this incident; (3) deviation from the 'intra-company baseline' of percent of clients normally affected by this incident; (4) deviation from the 'inter-company baseline' of percent of clients normally affected by this incident; and (5) type of devices part of this incident.

The prioritization is performed by the network incident identification and analysis system by using high-level metrics based around the percent and type of affected clients, as well as deviations of this percent from the baseline for a given incident. By contrast, tradition solutions have been known to prioritize via thresholds and deviations from individual raw metrics. For any incident that is above a certain priority level, an alert can immediately be sent to the user.

To determine the intra-company baseline deviation for an incident occurrence, the following method is used: network incident identification and analysis system. In one exemplary embodiment, the current incident occurrence is at time t (i.e., occurred between t−T and t), and involves $X\_t$ out of $Y\_t$ clients being affected. The baseline to be compared against involves examining the same incident type for a time period between $t-T1 \rightarrow t-T2$, where T1 is on the order of days or weeks (e.g., 2 weeks), and T2 would be a sufficient gap so that incident history is considered vs. the current incident occurrence itself (e.g., $T2>2*T$). Next, for each time i in $\{t-T1 \rightarrow t-T2\}$, let $X\_i$ out of $Y\_i$ clients be affected by this incident occurrence.

The baseline average of the percent of clients having poor performance when approximately $Y\_t$ clients are present is equal to the weighted average of the $(X\_i/Y\_i)$ values weighted inversely proportional to $|Y\_i-Y\_t|$. Similarly, the baseline standard deviation is a weighted standard deviation according to the same weights. In this way, deviations from the intra-company are deemed small or large based on the number of baseline standard deviations the current incident occurrence's percent of affected clients is from the baseline average. Notably, the intra-company baseline may be calculated for infrastructure based incidents in the exact same manner. Specifically, higher weight may be given to the historical incident occurrences when the number of active infrastructure elements (with respect to the specific incident type) are approximately the same as the current incident occurrence.

To determine the inter-company baseline deviation for an incident occurrence, the following method is used: network incident identification and analysis system. In one exemplary embodiment, the first determination is the set of "similar companies" $\{C\}$ with whom to consider part of the baseline. This may be determined using the following parameters: (1) Vertical (e.g., higher education, hospital, high-tech enterprise, and the like); (2) Size of environment; (3) Location (i.e., urban vs. rural); and (4) Device mix.

Once the set of similar companies is determined by the network incident identification and analysis system, the inter-company baseline can be calculated in a similar fashion to the intra-company baseline. Using a historical time $t-T3 \rightarrow t-T2$, for each time i in $\{t-T3 \rightarrow t-T2\}$, let $X\_c\_i$ out of $Y\_c\_i$ be clients have had poor Wi-Fi performance for company c. The equivalent intra-company baseline algorithm can be used with all of these data points versus the ones in the same company.

In another aspect, the network incident identification and analysis system also determines cross-company factor comparisons for network incidents. The factors help identify the differences in the cross-company environment that lead to differences in the baseline performance. In one example of a cross-company factor comparison using the network incident identification and analysis system, a set of network incidents are identified over a time period $t1 \rightarrow t2$. In this example, the reference number of clients/infrastructure is fixed relevant to that incident at either an absolute number N or percentile P. For any incident type, a static list of "influencing factors" is defined. In a first example network incident, it was determined that "Clients had poor Wi-Fi performance." The factors in this first example network incident include: (1) AP-Models; (2) Controller software version; (3) Channel widths; and (4) AP degree.

In a second example network incident, it was determined that "Client could not connect due to RADIUS issues." The factors in this second example network incident include: (1) Controller software version; (2) Controller RADIUS configuration; (3) RADIUS protocols in use; and (4) RADIUS server type.

For each network incident type, over the time period between $t1 \rightarrow t2$, the network incident identification and analysis system performs a cross-company analysis among "similar companies" to compare the factors of this company to the best performing and worst performing companies, from a client perspective for a client incident type, and from an infrastructure perspective for an infrastructure incident type.

In this process, a client incident type and an absolute reference number of clients N are assumed and the following steps are performed: (1) For each company, find the intra-company baseline for that network incident with respect to total number of clients equal to N. (2) For each company, for the R most relevant network incidents that contributed to the intra-company baseline, aggregate the client distribution of the comparison factors (e.g., percentage of clients that connected to AP-model X, controller software version number, and the like). (3) Rank the intra company baselines, and pick out the top X and bottom Y companies; for each of these companies show the client distributions of the comparative factors.

Notably, a similar analysis can be performed for a reference percentile P, except that the set of relevant network incidents for the baseline of each company is simply the set of network incidents whose total number of clients or infrastructure is close to the percentile P over the time period between t1→t2.

In another aspect, the network incident identification and analysis system also performs long run root cause analysis. In one example of a long run root cause analysis using the network incident identification and analysis system, a set of network incidents are identified over a time period t1→t2. In this example, the reference number of clients/infrastructure is fixed relevant to that incident at either an absolute number N or percentile P. To determine the long run root cause, the relevant incident occurrences are selected (as described in above for N or P), and for each network incident the client/infrastructure potential root cause distributions are aggregated to determine the overall root cause distribution.

In still another aspect, the network incident identification and analysis system also performs outlying subgroup analysis over a longer time period. Again, the reference number of clients/infrastructure is fixed relevant to that incident at either an absolute number N or percentile P. In performing the outlying subgroup analysis, the relevant incident occurrences are selected (as described in above for N or P). Next, the network incident identification and analysis system identifies which subgroups manifest themselves the most as repeated outliers. This may be performed by summing, for every relevant incident occurrence where subgroup G was an outlying subgroup, the value $X\_g/Y\_g$, where this value represents the percent of affected clients within that subgroup. The outlying subgroup with the maximum value for this metric is the outlying subgroup determined to be the most outlying over time.

In yet another aspect, the network incident identification and analysis system also performs causal analysis. In the performance of causal analysis, the first step is to compute the intra-company baseline. Next, the intra-company baseline is overlaid with detected changes in related factors, general configuration, and the like. Additionally, the network incident identification and analysis system can overlay manually annotated relevant important events. This overlaid baseline graph is analyzed to automatically detect if a change in the intra-company baseline coincides with the any automatic or manually annotated changes. If a change in the intra-company baseline does coincide with any automatic or manually annotated changes, then one or more causalities between an event and the baseline may be determined.

FIG. 17A illustrates a computer screenshot displaying a client network incident for a network device. Specifically, the computer screenshot shows the troubleshooting of a client device that could not connect due to DNS issues. Potential root causes were identified as well as potential remediation steps. Potential remediation steps may include network configuration changes and/or network upgrades to increase capacity.

Figure 17B:
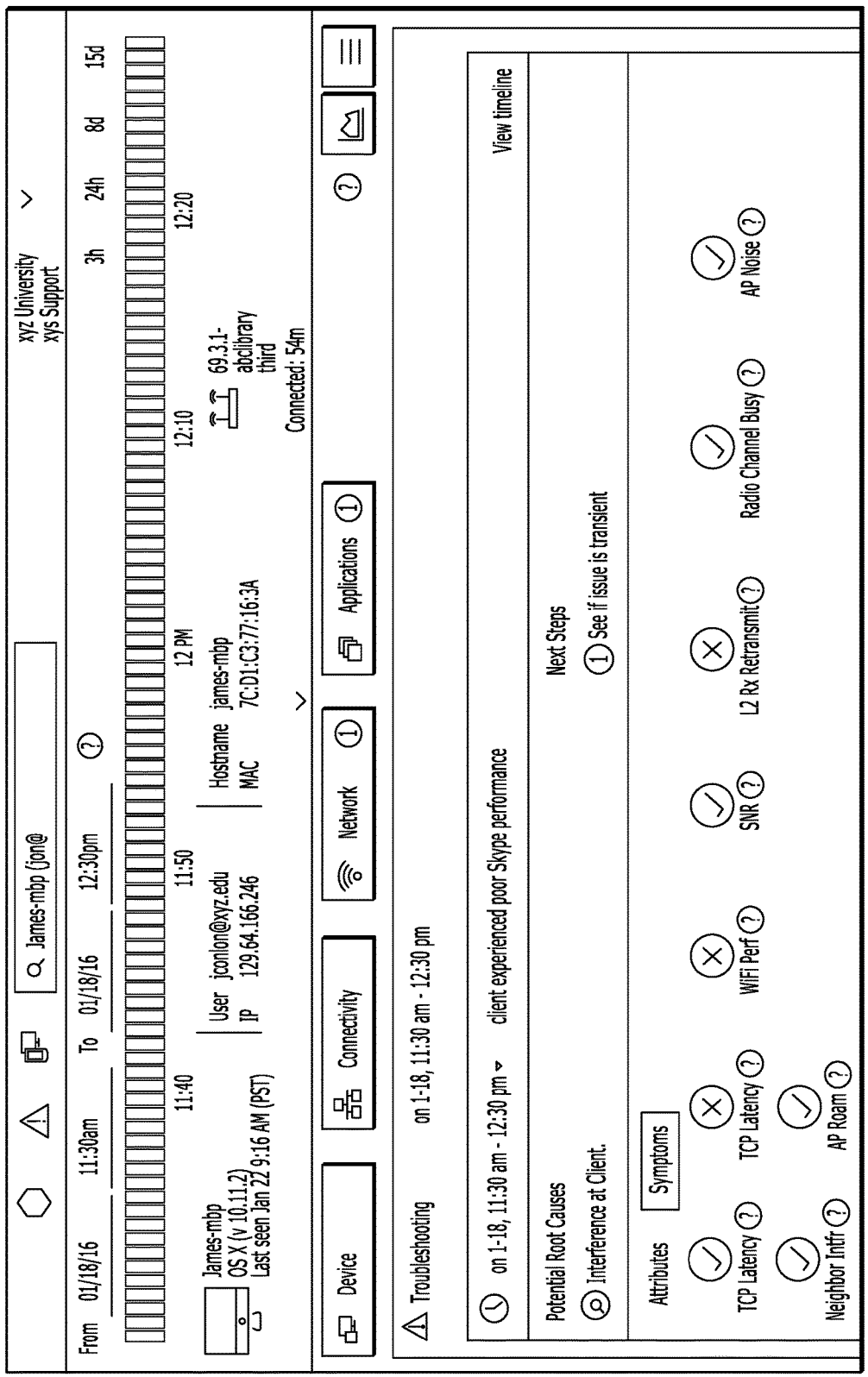
FIG. 17B illustrates a computer screenshot displaying a client network incident for a wireless network device.

FIG. 17B illustrates a computer screenshot displaying a client network incident for a wireless network device. Specifically, the computer screenshot shows the troubleshooting of a client device that experiences poor Skype performance. Potential root causes were identified as well as analysis of the symptoms including: TCP latency, TCP retransmit, Wi-Fi performance, SNR, L2 Rx Retransmit, Radio Channel Busy, AP Noise, Neighbor Interference, and AP Roam.

Figure 17C:
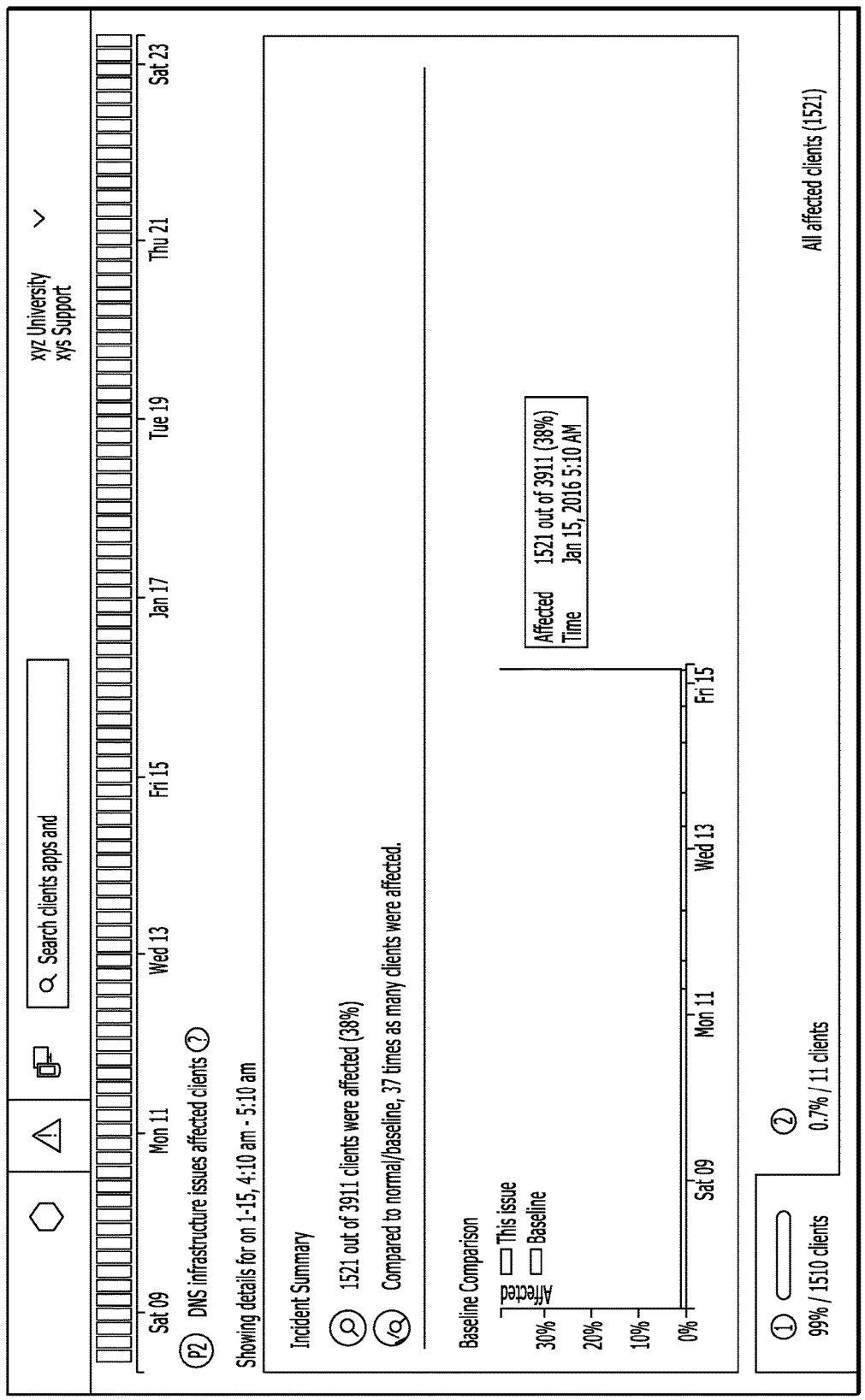
FIG. 17C illustrates a computer screenshot displaying an infrastructure network incident for a wired network device.

FIG. 17C illustrates a computer screenshot displaying a group infrastructure network incident. Specifically, the computer screenshot shows the troubleshooting of a DNS infrastructure issue that is affecting clients. An incident summary is displayed as well as a baseline comparison.

Figure 17D:
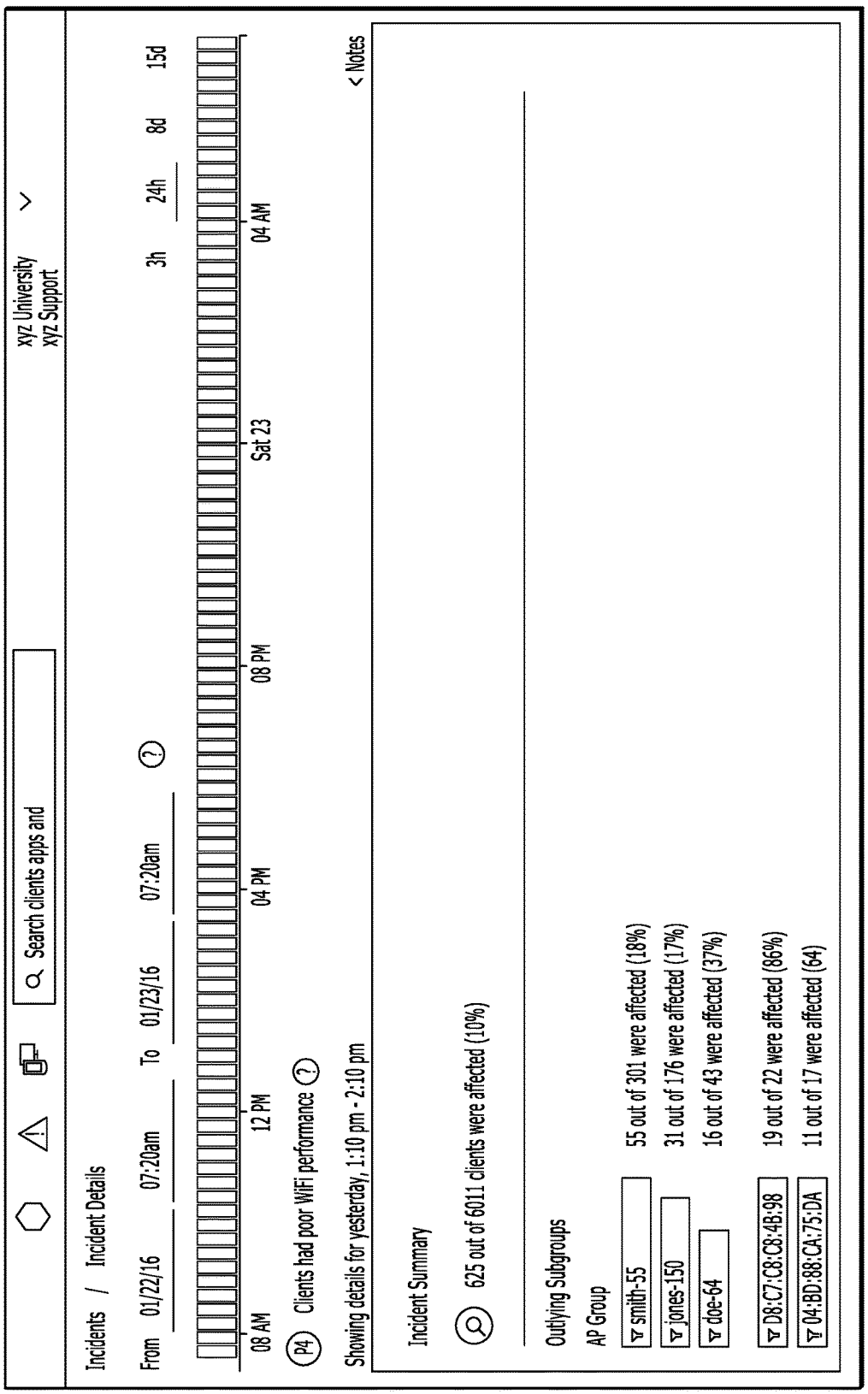
FIG. 17D illustrates a computer screenshot displaying a group network incident for wireless network devices, as well as an Outlying Subgroups analysis.

FIG. 17D illustrates a computer screenshot displaying a group network incident for wireless network devices. Specifically, the computer screenshot shows the troubleshooting of clients having poor Wi-Fi performance. An incident summary is displayed as well as an Outlying Subgroups analysis.

Figure 17E:
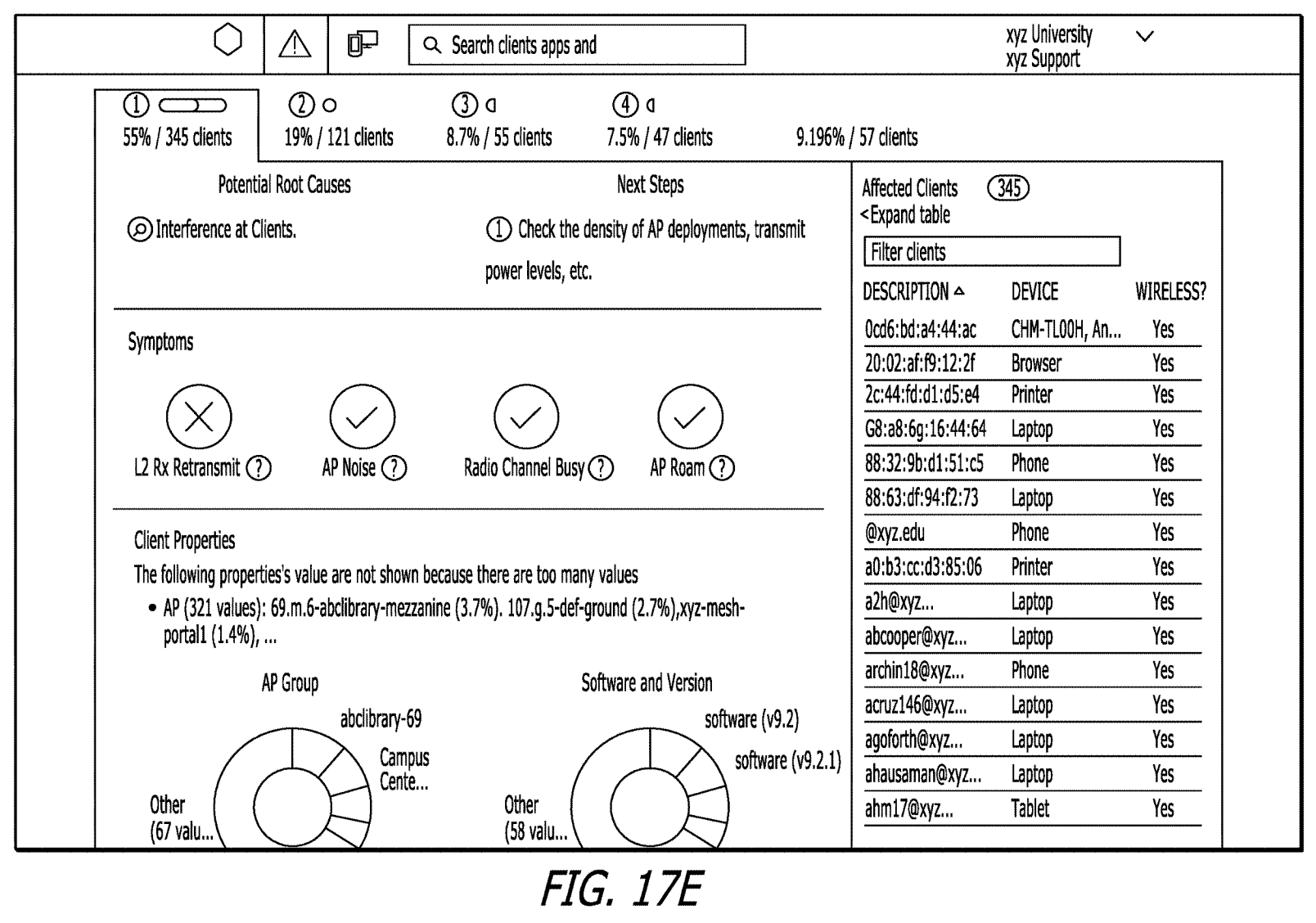

FIG. 17E illustrates a computer screenshot displaying a group network incident for wireless network device, as well as a root causes analysis. An analysis of the symptoms was performed, including: L2 Rx Retransmit, AP Noise, Radio Channel Busy, and AP Roam. Grouping by client properties was also performed.

Figure 18:
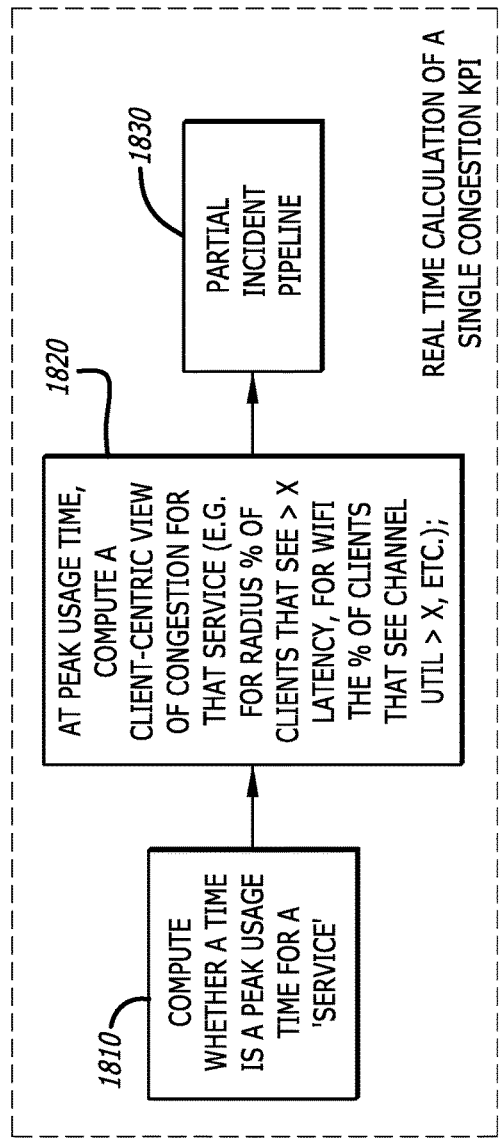
FIG. 18 illustrates a logic flow diagram of a client congestion metrics for cross-company real-time network data analysis.
Figure 18:
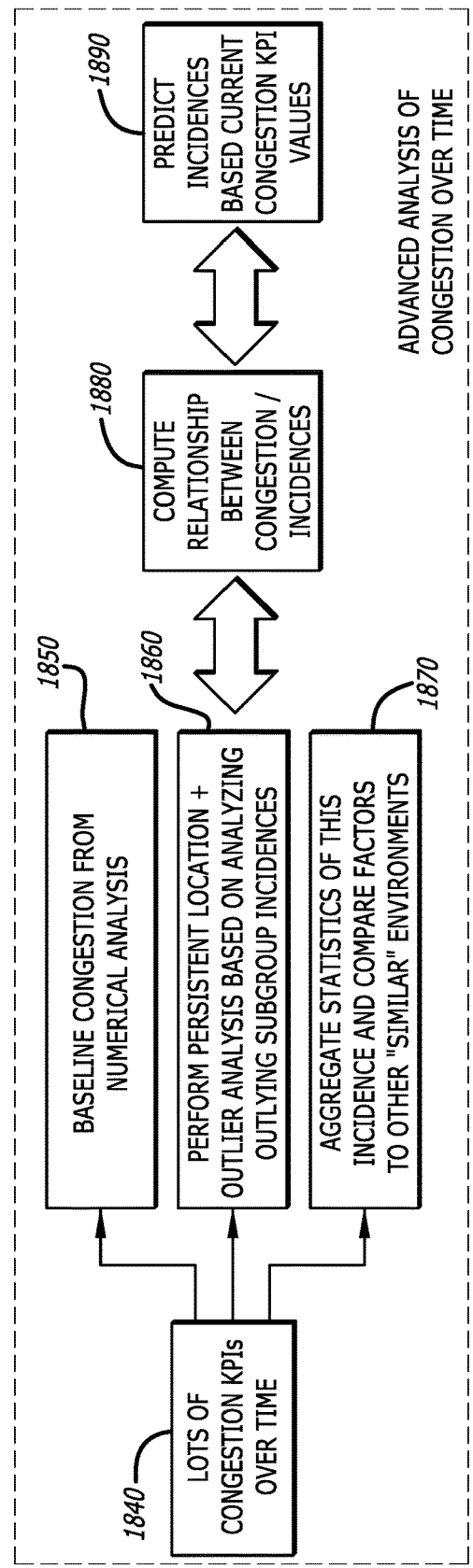

Computing Client Congestion Metrics from Cross-Company Real-Time Network Data:

Referring now to FIG. 18, other embodiments of the systems and methods disclosed herein are directed towards computing client congestion metrics from real-time network data. Additionally, some embodiments of the disclosed network congestion analysis and management system and method include finding outlying subgroups for client congestion, comparing the client congestion metrics across the current company and other "similar" companies. Moreover, further time-based analysis of the congestion metrics may be performed using embodiments of the system.

As shown in FIG. 18, the congestion analysis and management system and method may be used to perform real-time calculations of a single congestion. At step 1810, the system computes whether a time is a "peak usage time" for a "service." At Peak Usage time (step 1820), the system computes a client-centric view of congestion for that service (e.g., for RADIUS, the percent of clients that see a latency greater than X; for Wi-Fi, the percent of clients that see channel utilization greater than X). At step 1830, a Partial Incident Pipeline is shown.

Also shown in FIG. 18, the congestion analysis and management system and method may be used to perform advanced congestion analysis of over time. At step 1840, the system identifies many of Congestion KPIs (Key Performance Indicators) over time. At step 1850, the system determines baseline congestion from numerical analysis. Next, at step 1860, the system performs persistent location and outlier analysis by analyzing outlying subgroup incidences. At step 1870, the system aggregates statistics of this incidence and compares factors to other "similar" environments. At step 1880, the system computes the relationship between the congestion and the incidences. Then at step 1890, the system predicts future incidences based current congestion KPI values.

As described above, the disclosed network congestion analysis and management system and method examine multiple sources of real-time input network data, including: (1) metadata gleaned from deep packet analysis of real network traffic; (2) data from existing network elements, such as wireless controllers, access points, and the like (3) data from other on-premise systems, such as Microsoft Lync servers, and the like.

This combined real-time data is received into the network congestion analysis and management system, where the data is time-aligned, such that for every time T (for individual clients), there is a record of client data including: (1) Device/OS information; (2) Wireless metrics, such as SNR, packet loss/retransmits, connected Access Point, Channel Utilization at the AP, and the like; (3) L2-L4 information such as VLAN, receiver/transmitter bytes/packets, DSCP, TCP latency/retransmits, and the like; (4) Network services related L7 information such as DHCP, DNS, and RADIUS protocol info and response times; (5) L5-L7 information such as SSL Certificate, hostnames, HTTP response times; and (6) Application ID for detected applications such as Skype, SaaS applications, and the like.

In another aspect of the network congestion analysis and management system, the data is time-aligned, such that for every time T (for access points and wireless LAN controllers), there is a record of wireless information such as: (1) Detected noise and interference levels on each channel; (2) Information about neighboring APs and topology; (3) CPU/Memory utilization, reboots, and the like.

In some embodiments of the network congestion analysis and management system, where data is pulled from other on-premise systems, there could be additional client and/or infrastructure information for every time T, including: (1) UC systems (e.g., Microsoft Lync) call quality records including client MOS scores, jitter, packet loss, abnormal call terminations, and the like; (2) CPU/Memory utilization information from DHCP, DNS, RADIUS servers, as well as other network elements; and (3) Netflow/Sflow/SNMP records from Routers, switches, and the like. NetFlow is a network protocol for collecting IP traffic information and monitoring network traffic to analyze flow data and create a picture of network traffic flow and volume. sFlow is a network traffic measurement system technology that is embedded in a network device and provides continuous statistics on any protocol (L2, L3, L4, and up to L7), thereby enabling traffic throughout a network to be accurately characterized.

In some embodiments of the disclosed here network congestion analysis and management system and method, a client congestion metric for a given service X is defined as: "At 'peak usage' of service X, what percentage of clients face congestion that are due to the infrastructure?" In this scenario, a Peak Usage of a service over a time period between T1 and T2 is defined below. First, the overall time period [T1, T2] is sliced into even periods of time length T. An example would be [T1, T2] representing a week, and T representing 1 hour.

Continuing, in this scenario, the "usage" during a particular time is the number of clients that are accessing that service during the time T. For example, for DHCP, the usage refers to the number of client devices that requested an IP address from a DHCP server over that time. In other embodiments, the usage refers to a more granular usage metric such as bandwidth, number of transactions, number of roams, or (for Internet access) RADIUS and Wi-Fi, respectively.

In the scenario described above, the term "peak" is defined as "at or exceeding" a certain usage percentile. In one example, the peak hours of RADIUS usage over a two-week period is defined as the hours in which "usage" exceeded the 90th percentile.

Finally, in this scenario, a client is congested for a service if, during the peak time T, the client faces "congestion" due to the infrastructure. In one example, with respect to DHCP, congestion due to infrastructure refers to a client facing an average transaction time greater than X for over Y percent of the time. With respect to Internet access, this may refer to a client whose underlying Wi-Fi connectivity is strong, but the client may suffer from an average HTTP response time that is greater than Z for over Y percent of the time. With respect to Wi-Fi, the congestion due to infrastructure may refer to a client connecting to an access point radio with channel utilization greater than A for over Y percent of the time, or over K number of other clients connected for over Y percent of the time.

Referring now to outlying subgroup analysis, in some embodiments of the disclosed network congestion analysis and management system and method, all of the clients facing congestion are grouped together for a given (peak) time period T. In one example, this congestion may be described as "Between peak time 10:00 am-11:00 am on Jan. 1, 2016, 150 out of 1000 clients had faced Internet congestion." This peak congestion occurrence says that during the time T (i.e., 10 am-11 am on Jan. 1, 2016), 150 clients faced Internet congestion, whereas 850 other clients that were also using Internet did not experience this congestion.

Continuing, in this scenario the congestion occurrence is analyzed for the presence of any "outlying subgroups." An outlying subgroup may be identified as follows: (1) Partition the total number of clients according to some grouping (e.g., by AP-Group, AP, generic Location, device type and/or OS, radio channel, and the like); (2) Identify particular subpartitions as an outlying subgroup if the percent of affected clients is "much higher" than the overall percent of affected clients/infrastructure; and (3) Defined "Much higher" statistically by assuming a binomial distribution for the number of client being "affected" within any subgroup, and looking for the probability of a subgroup having a particular number of affected clients higher than X.

Referring now to an example of an outlying subgroup from the previous embodiment, a particular AP-Group X, during the same time T, had 120 out of 150 clients with poor Internet performance. This data implies that the percent of affected clients in AP group X is 80 percent even though the overall percent of affected clients is only 15 percent. According to a binomial distribution, the probability of this occurring is infinitesimally small, and thus AP group X would be flagged as an outlying subgroup within this congestion occurrence.

Referring now to intra-company and inter-company trend calculation, since congestion metrics are only calculated during "peak times," the intra-company trend is simply the time series of these values.

To determine the inter-company congestion trend, the first step is to identify the set of "similar companies" {C} to be considered part of the baseline. The disclosed network congestion analysis and management systems and methods perform this process using parameters that include: Vertical (e.g., higher education, hospital, high-tech enterprise, etc.); Size of environment; Location (i.e., urban vs. rural); Device mix; and the like. Once the set of similar companies is determined, the inter-company baseline may be calculated in a similar fashion to the intra-company baseline.

Referring now to cross-company factor comparison for congestion metrics, the disclosed network congestion analysis and management systems and method calculates a set of congestion metrics for time instances over a time period t1→t2, (per the explanation of the previous section). Continuing, the disclosed network congestion analysis and management systems and method employs a list of "influencing factors." Multiple example scenarios are provided below. In the first example, Wi-Fi Congestion Metric, the influencing factors include: AP-Models; Controller software version; Channel widths; AP degree, and the like. In the second example, RADIUS Congestion Metric, the influencing factors include: Controller software version; Controller RADIUS configuration; RADIUS protocols in use; RADIUS server type, and the like.

For each congestion metric, the disclosed network congestion analysis and management systems and method employs a cross-company analysis among "similar companies" (explained in the previous section) over the time period between t1→t2 to compare the factors of this company to the best performing and worst performing companies. To perform this analysis, the following steps are performed for a specific congestion metric: (1) For each company, find the intra-company trend for that congestion metric; (2) For each company, for the R most relevant times that contributed to the intra-company trend, aggregate the client distribution of the comparison factors (e.g., percent of clients that connected to AP-model X, controller software version X, and the like); and (3) Rank the intra company trends, and pick out the top X and bottom Y companies. For each of these companies, the client distributions of the comparative factors are displayed.

Referring now to long run outlying subgroup analysis and causal analysis, the disclosed network congestion analysis and management systems and methods employ a set of congestion metrics for time instances over a time period t1→t2, (per the explanation of the previous section).

With respect to the long run outlying subgroup analysis, the first step performed by the disclosed systems and methods is to identify the time instances over which the peak congestion metric was calculated (as previously discussed). Next, the disclosed network congestion analysis and management systems and methods examine which subgroups manifest themselves the most as repeated outliers over time. One way to achieve this information is to simply sum, for every relevant peak congestion occurrence where subgroup G was an outlying subgroup, the value X_g/Y_g, where this represents the percentage of affected clients within that subgroup. Accordingly, the outlying subgroup with the maximum value for this metric is the outlying subgroup deemed most outlying over time.

With respect to causal analysis, the first step performed by the disclosed network congestion analysis and management systems and methods is to compute the intra-company baseline. Next, the disclosed systems and methods overlay this baseline with detected changes in related factors, general configuration, and the like. Additionally, the disclosed network congestion analysis and management systems and methods may overlay annotated relevant important events. This overlaid baseline graph may be analyzed by disclosed systems and methods to automatically detect if a change in the intra-company baseline coincides with any automatic or manually annotated changes. If such baseline coincides have occurred, then a causality between an event and the baseline may be determined.

Notably, with respect to all of the previous sections, the above-described steps do not all need to be performed in any embodiment. In some embodiments, less than all of these steps are performed. Additionally, in other embodiments, some of the above-described steps may be performed out of order.

Figure 19:
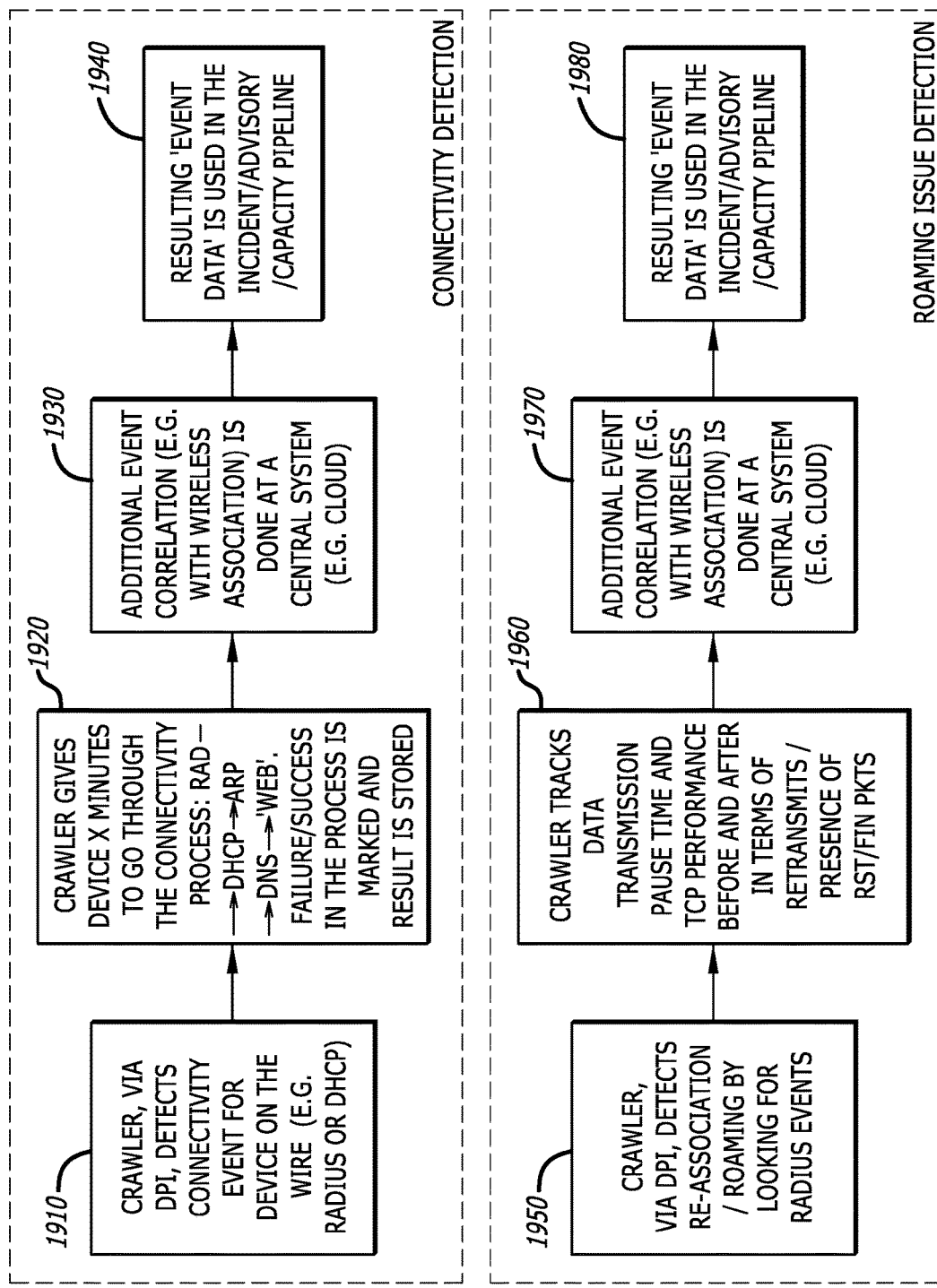
FIG. 19 illustrates a logic flow diagram of an information extraction system and method for real-time network packet data analysis for connectivity detection and roaming issue detection.

Using Real-Time Packet Data in Conjunction with Other Sources to Detect Wired/Wireless Network Issues:

Referring now to FIG. 19, other embodiments of the systems and methods disclosed herein are directed towards extracting information from real-time network packet data. This information is then combined with data from other sources to detect client Connectivity & Roaming Network issues. The disclosed network information extraction systems and methods examine two key sources of data: Real client network traffic and Data from Wireless Controllers.

The "crawler" component of the disclosed network information extraction system and method examines network traffic and is responsible for extracting information from client network traffic. This extracted information from client network traffic enables the rest of the disclosed network information extraction systems and methods to detect connectivity and roaming issues. Note that the "crawler" can perform the role of what is referred to as a "loupe collector", and may collect additional information or a different set of information.

With respect to connectivity issues, in some embodiments the crawler performs the following steps for every client device X in the network. These steps include: (1) Detecting when X initiates an "on-the-wire" connectivity event, by looking for either a RADIUS request, DHCP discover, or DHCP request packet; (2) After detecting an "on-the-wire" connectivity event, the Crawler waiting Y minutes for the Client to accomplish an "Internet event" (e.g., TCP or UDP traffic transmitted either to a public IP address, or to a different subnet); (3) At the end of Y minutes (or sooner in the case of an Internet event) the crawler recording the following information: (A) RADIUS last state (e.g., failed, success, timeout, and the like); (B) DHCP last state (e.g., Offer, Acknowledgement, No Acknowledgement, timeout, and the like); (C) ARP last state with respect to default gateway (response, timeout, and the like); and (D) DNS response (response, timeout, and the like); and (4) The crawler packaging this information as "connectivity event information" and sending this information to the analytics section 1330 of the disclosed network information extraction systems and methods.

Referring again to FIG. 19, the network information extraction systems and methods may be used to detect connectivity issues in an aspect of one embodiment. At step 1910, the Crawler component of the system, via deep packet inspection, detects connectivity event for device on the wire (e.g., RADIUS or DHCP). Then at step 1920, the Crawler component of the system gives a client device X minutes to go through the connectivity process: RAD→DHCP→ARP-→DNS→"WEB." The failure of success of the process is marked, and result is stored. Next at step 1930, additional event correlation (e.g., with wireless association) is performed at the analytics section 1330 of the disclosed network information extraction system and method. At step 1940, the resulting "event data" is incorporated into the INCIDENT/ADVISORY/CAPACITY PIPELINE.

With respect to roaming issues, in some embodiments the crawler performs the following steps for every wireless client device X in the network. These steps include: (1) Detecting when X initiates an "on-the-wire" association event, by looking for a RADIUS request with metadata indicating association with a particular access point, SSID, and the like; (2) Buffer statistics about traffic such that given an "on-the-wire" association event, the crawler determines: (A) If there was traffic before the event, the total time, T1, between the last traffic packet before and the first traffic packet after the event; (B) If there was TCP traffic before the event, the presence of high percent of TCP retransmitted packets, R1, before and/or after the event; and (C) If there was TCP traffic before the event, the presence of a high percentage of TCP reset and synchronize packets, R2, before and/or after the event; and (3) The crawler packaging this information as "connectivity event information" and sending this information to the analytics section 1330 of the disclosed network information extraction systems and methods.

Referring once again to FIG. 19, the network information extraction systems and methods may be used to detect roaming issues in an aspect of one embodiment. At step 1950, the Crawler component of the system, via deep packet inspection, detects re-association/roaming by looking for RADIUS events. At step 1960, the crawler component of the system tracks data transmission pause time and TCP performance before and after with respect to retransmissions and the presence of RST (reset)/FIN (finish) packets. Next, at step 1970, additional event correlation (e.g., with wireless association) is performed at the analytics section 1330 of the disclosed network information extraction system and method. At step 1980, the resulting "event data" is incorporated into the INCIDENT/ADVISORY/CAPACITY PIPELINE.

Continuing, with respect to roaming issues without "on-the-wire" association events (e.g., in systems where "fast roaming" is enabled), for each wireless client X in the network, the crawler computes "roaming event information" based on short, sliding window periods of time T (i.e., with T being on the order of seconds or tens of seconds). The "sliding window roaming event information" blocks are sent to the analytics section 1330 of the disclosed network information extraction systems and methods.

Notably, in addition to the basic information itself, the crawler also sends additional metadata (e.g., associated access point, RADIUS user name, number of failures/timeouts, and the like) to the analytics section 1330 described above so that the disclosed network information extraction systems and methods may disambiguate a root cause, as well as determine other detailed evidence regarding the detected issues.

The analytics section 1330 of the disclosed systems and methods receives the previously mentioned data from the crawler. With respect to connectivity issues, the analytics section 1330 of the disclosed systems and methods may transform the connectivity event information into indications of a "connectivity incident." In one embodiment, if the last state of the connectivity event information was a "RADIUS Reject," then the system may indicate a network incident such as "Client could not connect due to RADIUS Issues." This network incident may then be passed through the rest of the analytics pipeline described above.

With respect to roaming issues based on "on-the-wire association" events, the analytics section 1330 of the disclosed systems and methods may also simply transform the roaming event information into indication of a "roaming incident." In one embodiment, if T1, R1, R2 exceeded pre-defined thresholds, the system indicates a network incident such as "Client had roaming issues." This network incident may then be passed through the rest of the analytics pipeline of the disclosed systems and methods as described above.

With respect to roaming issues without "on-the-wire" association events, the analytics section 1330 of the disclosed systems and methods employ a separate source of wireless roaming events for each client X, which can be gleaned from WLAN controllers, Access Points, and the like. For each wireless roaming event for client X at time t, the analytics section 1330 of the disclosed systems and methods checks for a "sliding window roaming event information" that includes time T, and transforms the resultant information into an indication of a "roaming incident" described above. This network incident may then be passed through the rest of the analytics pipeline of the disclosed systems and methods as described above.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed:

1. A method of extracting information from real-time network data to analyze connectivity data for client devices in a network, the method comprising:

detecting when the client devices initiate a connectivity event;

after detecting a connectivity event, waiting a period of time for the client device to either reach or fail to reach a network connected state;

after waiting a period of time, recording connectivity event information;

sending the recorded connectivity event information to an analytics system for network incident and network congestion analysis;

analyzing, via a remote network manager, (1) the network traffic data from a plurality of network elements in a network and (2) network management data from an enterprise system in the network, wherein the network management data includes L1 through L7 network topology data, network configuration data, and simple network management protocol data;

detecting network incidents from the connectivity event information on the real-time network data and the analysis of the network traffic data and network management data;

identifying one or more root causes of the detected network incidents; and determining remediation of the identified one or more root causes of the detected network incidents.

2. The method of claim 1, wherein the connectivity event comprises a connectivity event determined by looking for a Remote Authentication Dial-In User Service (RADIUS) request, Dynamic Host Configuration Protocol (DHCP) discover message, or DHCP request message.

3. The method of claim 1, wherein a network connected state comprises the client device authenticated with the network, having a valid IP address, and being able to communicate with internal or external computer hosts.

4. The method of claim 3, wherein being able to communicate with internal and external computer hosts includes data traffic transmitted either to a public IP address, or to a network subnet using any Transport Layer protocol such as Transmission Control Protocol (TCP), User Datagram Protocol (UDP), Real-time Transport Protocol (RTP), Secure Real-time Transport Protocol (SRTP) and File Transfer Protocol (FTP) protocol.

5. The method of claim 1, wherein connectivity event information includes one or more of: RADIUS last state, DHCP last state, ARP (Address Resolution Protocol) last state with respect to default gateway, DNS (Domain Name Server) response, and communication with internal or external computer hosts.

6. The method of claim 5, wherein a RADIUS last state includes one or more of failed, success, and timeout.

7. The method of claim 5, wherein a DHCP last state includes one or more of Offer, Acknowledge, and Negative Acknowledgement, timeout.

8. The method of claim 5, wherein an ARP last state with respect to default gateway includes one or more of response and timeout.

9. The method of claim 5, wherein a DNS last state includes one or more of response and timeout.

10. The method of claim 1, wherein the analytics system computes baseline time-series from the computed network incidents and compares baselines across multiple environments.

11. The method of claim 1, wherein the real-time network data includes one or more of: data obtained from deep packet analysis of real-time network traffic, data from network elements including wireless controllers, access points, on-premise network systems, and system logs.

12. The method of claim 1, wherein the real-time network data includes: device information OS (Operating System) information, wireless metrics, Layer 2 through Layer 4 information, network services related Layer 7 information, Layer 5 through Layer 7 information, and application related data.

13. The method of claim 12, wherein the wireless metrics include one or more of SNR (signal to noise ratio), packet loss, packet retransmits, connected access points, channel utilization at the access points, neighboring access points information, outside-network access points information, interference information in the RF (Radio Frequency) bands, network topology information, CPU (Central Processing Unit) utilization, memory-utilization, configuration of wireless controllers, and configuration of access points.

14. The method of claim 12, wherein Layer 2 through Layer 4 information includes one or more of VLAN (Virtual Local Area Network) data, receive packets, transmit packets, DSCP (Differentiated Services Code Point) data, TCP (transmission control protocol) related data, UDP (User Datagram Protocol) related data, RTP (Real-time Transport Protocol) related data, SRTP (Secure Real-time Transport Protocol) related data, and FTP (File Transfer Protocol) protocol related data.

15. The method of claim 12, wherein network services related Layer 7 information includes one or more of DHCP (Dynamic Host Configuration Protocol), DNS (Domain Name System), RADIUS (Remote Authentication Dial-In User Service) protocol information, request times, response times, and failure codes.

16. The method of claim 12, wherein Layer 5 through Layer 7 information includes one or more of SSL (Secure Sockets Layer) Certificate, hostnames, and HTTP (Hypertext Transfer Protocol) response times.

17. The method of claim 12, wherein the real-time network data is pulled from on-premise systems and includes one or more of Netflow records, Sflow records, SNMP (Simple Network Management Protocol) records from routers, switches, and network elements.

18. A method of extracting information from real-time network data to analyze connectivity data for client devices in a network, the method comprising:
  detecting when the client devices initiate a connectivity event;
  after detecting a connectivity event, waiting a period of time for the client device to either reach or fail to reach a network connected state;
  after waiting a period of time, recording connectivity event information;
  sending the recorded connectivity event information to an analytics system for network incident and/or network congestion analysis;
  analyzing, via a remote network manager, (1) the network traffic data from a plurality of network elements in a network and (2) network management data from an enterprise system in the network, wherein the network management data includes L1 through L7 network topology data, network configuration data, and simple network management protocol data;
  detecting network incidents from the connectivity event information on the real-time network data and the analysis of the network traffic data and network management data;
  identifying one or more root causes of the detected network incidents; and
  determining remediation of the identified one or more root causes of the detected network incidents; and
  automatically implementing the determined remediation, wherein the remediation of the network incidents comprises programming, via a controller, configuration settings of network infrastructure including one or more of wireless LAN (Local Area Network) controllers, access points, switches, routers, and firewalls.

* * * * *